US006301573B1

(12) United States Patent
McIlwaine et al.

(10) Patent No.: US 6,301,573 B1
(45) Date of Patent: Oct. 9, 2001

(54) RECURRENT TRAINING SYSTEM

(75) Inventors: John C. C. McIlwaine, Roswell; Matthew G. A. McConnell, Duluth, both of GA (US)

(73) Assignee: Knowlagent, Inc., Alpharetta, GA (US)

( * ) Notice: Subject to any disclaimer, the term of this patent is extended or adjusted under 35 U.S.C. 154(b) by 0 days.

(21) Appl. No.: 09/002,325

(22) Filed: Jan. 2, 1998

Related U.S. Application Data
(60) Provisional application No. 60/040,831, filed on Mar. 21, 1997.

(51) Int. Cl.[7] .................................................. G06F 15/18
(52) U.S. Cl. .............................. 706/61; 706/16; 706/60
(58) Field of Search .............................. 706/11, 61, 927, 706/14, 60; 434/322, 323, 350

(56) References Cited

U.S. PATENT DOCUMENTS 3,594,919 * 7/1971 Bell et al. ............................ 434/319
3,705,271 * 12/1972 De Bell et al. ...................... 360/74.4

(List continued on next page.)

OTHER PUBLICATIONS

Curilem et al, "Consideration for the design of a tutoring system applied to daibetes", IEEE Annual EMBS Int. Conf. pp 2811–281 1/2000.*
Granic et al, "User Interface Aspects of an Intelligent Tutoring System", IEEE ITI Conf. pp 157–164, 6/2000.*
Cybulski et al, "Teaching system analysis and design using multimedia and pattern", IEEE, pp 113–122, 2000.*
Armstrong, "Electronic Mail Order for Distance Learning," IEE Colloquium on Commercialising the Internet, pp. 4/1–4/4 Feb. 1997.*
"ACTV NET Debuts eSchool Online," Business Wire, Mar. 24, 1997, pp. 03241287.*

Primary Examiner—Mark R. Powell
Assistant Examiner—Anil Khatri
(74) Attorney, Agent, or Firm—King & Spalding

(57) ABSTRACT

A recurrent training method comprising the steps of configuring a computer to provide training-related information on a particular subject to a user of the computer, presenting through a computer training-related information to the user of the computer during a first training session at a first time, and initiating subsequent training sessions at recurrent times thereafter under computer control. Upon initiation of the subsequent training sessions, either by presenting training-related information to the user or by prompting the user for approval to present training-related information, the training method interrupts the user's interaction with other on-going activities on the computer, thereby reminding the computer user, at various times, of the need to perform training and, at the user's discretion, providing the user with recurrent training through recurrent training sessions. The training method also enables the user of the computer to establish the recurrent times at which subsequent training sessions are initiated by the computer through allowing the user to define a period of time between the termination of a training session and the initiation of a subsequent training session. The training method additionally enables the computer to suppress the initiation of one or more subsequent training sessions upon direction, given prior to initiation, to the computer by the user in the form of a period of time during which the initiation of subsequent training sessions is to be suppressed by the computer.

20 Claims, 32 Drawing Sheets

U.S. PATENT DOCUMENTS

| | | | |
|---|---|---|---|
| 4,684,349 | * | 8/1987 | Ferguson et al. .................... 434/308 |
| 5,310,349 | * | 5/1994 | Daniels et al. ....................... 434/350 |
| 5,311,422 | * | 5/1994 | Loftin et al. ............................. 703/2 |
| 5,535,256 | | 7/1996 | Maloney et al. ....................... 379/34 |
| 5,597,312 | * | 1/1997 | Bloom et al. ........................ 434/362 |
| 5,696,811 | | 12/1997 | Maloney et al. ....................... 379/34 |
| 5,727,950 | | 3/1998 | Cook et al. .......................... 434/350 |
| 5,757,644 | | 5/1998 | Jorgensen et al. . |
| 5,790,798 | | 8/1998 | Beckett, II et al. . |
| 5,818,907 | | 10/1998 | Maloney et al. ....................... 379/34 |
| 5,825,869 | | 10/1998 | Brooks et al. ....................... 379/265 |
| 5,827,071 | * | 10/1998 | Sorensen et al. .................... 434/323 |
| 5,833,468 | * | 11/1998 | Guy et al. ............................ 434/350 |
| 5,861,881 | * | 1/1999 | Freeman et al. ..................... 345/302 |
| 5,877,954 | * | 3/1999 | Klimasauskas et al. ............... 700/29 |
| 5,943,416 | | 8/1999 | Gisby ................................... 379/295 |
| 6,014,134 | * | 1/2000 | Bell et al. ............................ 345/329 |
| 6,044,368 | | 3/2000 | Powers .................................... 707/2 |
| 6,118,865 | | 9/2000 | Gisby ................................... 379/265 |
| 6,119,097 | | 9/2000 | Ibarra ..................................... 705/11 |
| 6,171,109 | * | 1/2001 | Ohsuga ................................ 434/118 |

* cited by examiner

RECURRENT TRAINING SYSTEM

Priority and Related Applications

The present application claims priority to provisional patent application entitled, "Recurrent Training System," filed on Mar. 21, 1997 and assigned U.S. application Ser. No. 60/040,831.

FIELD OF THE INVENTION

This invention relates generally to the field of training individuals, and in its preferred embodiment, to computer-related systems for training individuals.

BACKGROUND OF THE INVENTION

Today, seemingly more than in the past, companies are discovering that the general work force is ill-equipped and ill-trained, through a lack of formal training, prior work experience, or participation in apprenticeship programs, to perform necessary job-related tasks. Companies are also discovering that ill-trained workers fall into two major categories including a first category of workers who are new to the companies' industry and who have none of the necessary skills to perform tasks of interest to the companies. A second category of workers, perhaps including current employees, already have a certain type or level of skills, but do not have the required skills for a different job position having different skill requirements. Therefore, while still attempting to hire aptly-trained, qualified employees to fill various job positions, many companies have, nonetheless, undertaken the task of training workers to provide them with the skills and knowledge necessary to enable the workers to accomplish a variety of job-related tasks required by specific job positions and, thereby to become productive employees.

In order to accomplish the task of training workers, many companies send their workers to training programs which are developed and conducted by an in-house training department, or under contract, by an outside firm and which include company-specific content designed to meet company-defined training objectives. A company may also send its workers to training programs, conducted by outside firms or organizations, that are designed to generically train workers on a particular subject or task. Regardless of who develops, designs, and/or conducts a training program, such programs typically require that a worker attend a number of training sessions at a selected training site. Unfortunately, the training site is often distant from the worker's normal workplace (particularly when the training program is conducted by an outside firm or organization not under contract to the worker's company) and the training sessions are often on days and at times which do not fit conveniently into the worker's schedule. As a result, the worker must travel between the training site and the workplace and, perhaps, stay overnight near the training site. By requiring the worker to travel and to attend training sessions on inconvenient days and at inconvenient times, the worker's personal and professional lives are interrupted, potentially upsetting or distracting the worker and reducing his ability to learn new skills. Additionally, the worker's company incurs direct expenses related to the worker's travel and indirect expenses associated with the opportunity cost of work not accomplished while the worker is at the training site or while the worker travels to and from the training site.

The training sessions of typical training programs include presentations by individuals having certain relevant knowledge or expertise, "how-to" demonstrations, and "hands-on" training exercises. Such training sessions, especially if conducted without adequate company control, are often too long in duration and present too much training material, thereby causing many trainees to lose concentration and, otherwise, causing them to fail to comprehend and absorb the material. To make matters worse, it is often impossible to evaluate a trainee's comprehension and understanding of the training material provided in such training sessions and without such evaluation, it is difficult to determine whether or not additional training is necessary and if so, it is difficult to conduct immediate reenforcement training. Furthermore, unless the training program is developed in-house or under contract, the content of such training sessions may include material which is not relevant to, or up to date with, the objectives of a company.

Many companies have attempted to overcome the disadvantages associated with trainees having to travel to attend training programs by offering satellite-based instruction at the trainee's place of business. Unfortunately though, satellite-related equipment for satellite-based instruction is relatively expensive and is, therefore, often only available to a trainee in a specially-equipped training room. As a result, the trainee must still leave his work site (i.e., desk, workstation, etc.) to perform training. Also, because a company may only have one specially-equipped training room, the trainee must schedule use of the room or attend a scheduled satellite-based training session at time which is inconvenient. Some companies have attempted to overcome this scheduling difficulty by recording the satellite-based training sessions on videotape for later playback. Unfortunately though, the use of videotape does not alleviate the need for a trainee to leave his workstation in order to travel to a specially-equipped training room to view the videotape.

Other companies have attempted to counter the difficulties associated with conventional training programs by developing and offering self-paced training programs to their trainees. Sadly though, the performance of training exercises often required by such self-paced training programs is often not high on the list of priorities for many trainees. Other tasks, especially those tasks for which a trainee gets paid to perform and upon which a trainee's salary increases and/or promotions are based, typically receive more of the trainee's attention than does training. As a result, trainees often procrastinate with respect to performing self-paced training programs, or simply forget to perform them.

There is, therefore, a need in the industry for a training system which reminds and enables individuals to perform training at their own workstation, at their own pace, and according to their own schedule and which can solve other related and unrelated problems that become apparent upon reading and understanding this specification.

SUMMARY OF THE INVENTION

Briefly described, in a preferred form, the present invention comprises a training system wherein a computer, configured to provide training-related information on a particular subject to a user of the computer, presents training-related information to the user of the computer during a first training session at a first time and initiates subsequent training sessions at recurrent times thereafter. Upon initiating the subsequent training sessions, either by presenting training-related information to the user or by prompting the user for approval to present training-related information, the computer interrupts the user's interaction with other on-going activities on the computer, thereby reminding the computer user, at various times, of the need to perform training and, at the user's discretion, providing the user with recurrent training through recurrent training sessions.

Preferably, the training system enables the user of the computer to establish the recurrent times at which subsequent training sessions are initiated by the computer through allowing the user to define a period of time between the termination of a training session and the initiation of a subsequent training session. The training system also, preferably, enables the computer to suppress the initiation of one or more subsequent training sessions upon direction, given prior to initiation, to the computer by the user in the form of a period of time during which the initiation of subsequent training sessions is to be suppressed by the computer. Additionally, the training system preferably enables termination of a training session by the user at a time when certain training-related information is being presented to the user and presentation of the same training-related information upon initiation of the next subsequent training session.

According to the preferred form of the present invention, the training system also preferably includes configuring a second computer to communicate with a first computer, storing training-related information on the second computer, accessing the training-related information on the second computer from the first computer, and outputting the training-related information from the first computer to a user of the first computer. Preferably, the accessing of the training-related information on the second computer from the first computer is controllable by the second computer, in response to input from an administrator. Also, the training system preferably includes monitoring, at the second computer, of the training-related information accessed by the first computer and, hence, by the user undergoing recurrent training.

The training system, in accordance with the present invention, enables training of an individual on a particular subject at his/her normal workplace during normal work hours, thereby eliminating the need for the individual to travel to a training site, the incumbent costs of such travel (both in terms of the direct travel costs and the opportunity cost associated with the work that is not being performed while the individual attends training sessions), and the general interruption of the individual's professional and private lives. By automatically reminding the individual of the need to perform training at various times and allowing the individual to perform training or bypass training, the training system allows the individual to train at his/her own pace, when convenient, and allows the individual to perform his/her work-related tasks. Because the individual trains at his/her own pace and is not deluged, as is the case at many conventional training programs, with an excessive quantity of training-related information for excessive periods of time, training is not as objectionable and the individual is better able to concentrate, comprehend, and absorb the training information. Also, the training system enables control over the content of the training information presented to an individual and allows tailoring of the content to meet specific objectives. In addition, the training system enables monitoring of an individual's progress which, with conventional training programs, is often difficult to assess.

Accordingly, it is an object of the present invention to provide training to an individual.

Another object of the present invention is to provide training to an individual at recurrent times.

Still another object of the present invention is to provide training to an individual at times determined by the individual.

Still another object of the present invention is to provide training to an individual at times scheduled by the individual.

Still another object of the present invention is to provide training to an individual at a pace determined by the individual.

Still another object of the present invention is to provide training to an individual while the individual is at his/her customary workstation.

Still another object of the present invention is to enable an individual to restart training at a point where he/she previously ended training temporarily.

Still another object of the present invention is to remind an individual of the need to train.

Still another object of the present invention is to interrupt other tasks being performed by an individual so that the individual may review training materials and/or perform training exercises.

Still another object of the present invention is to enable overriding of the interruption of tasks other than training being performed by an individual.

Still another object of the present invention is to track the progress of an individual undergoing training.

Still another object of the present invention is to track the progress of an individual undergoing training from a site remote from the individual's training site.

Still another object of the present invention is to enable centralized administration and control of the types of training materials available to an individual.

Still another object of the present invention is to enable administration and control of the types of training materials available to an individual from a site remote from the individual's training site.

Still another object of the present invention is to enable centralized administration and control of the types of training materials accessible by an individual.

Still another object of the present invention is to enable administration and control of the types of training materials accessible by an individual from a site remote from the individual's training site.

Other objects, features, and advantages of the present invention will become apparent upon reading and understanding the present specification when taken in conjunction with the appended drawings.

DETAILED DESCRIPTION OF THE PREFERRED EMBODIMENT

Figure 1:
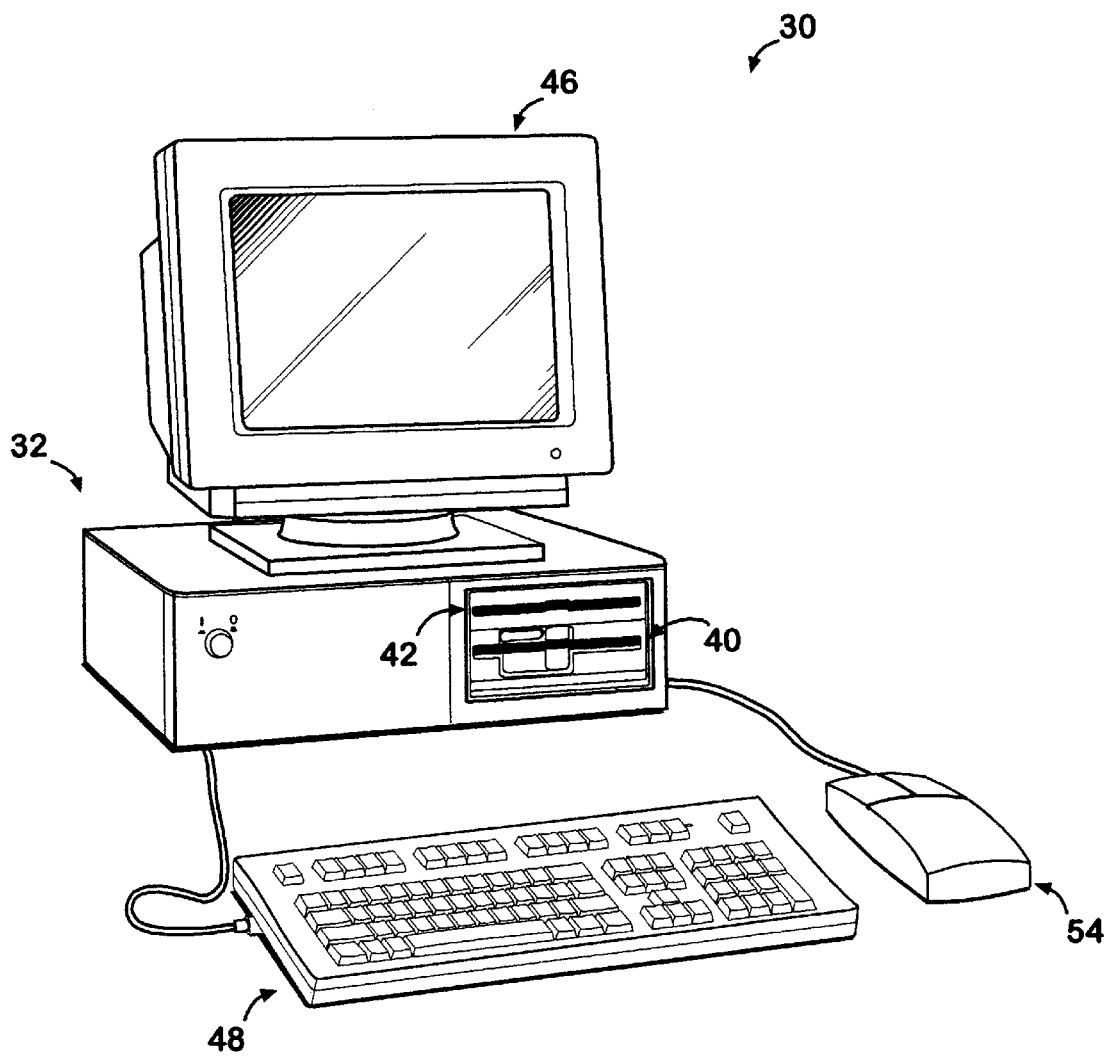
FIG. 1 is a pictorial representation of a recurrent training system in accordance with a preferred embodiment of the present invention.
Figure 2A:
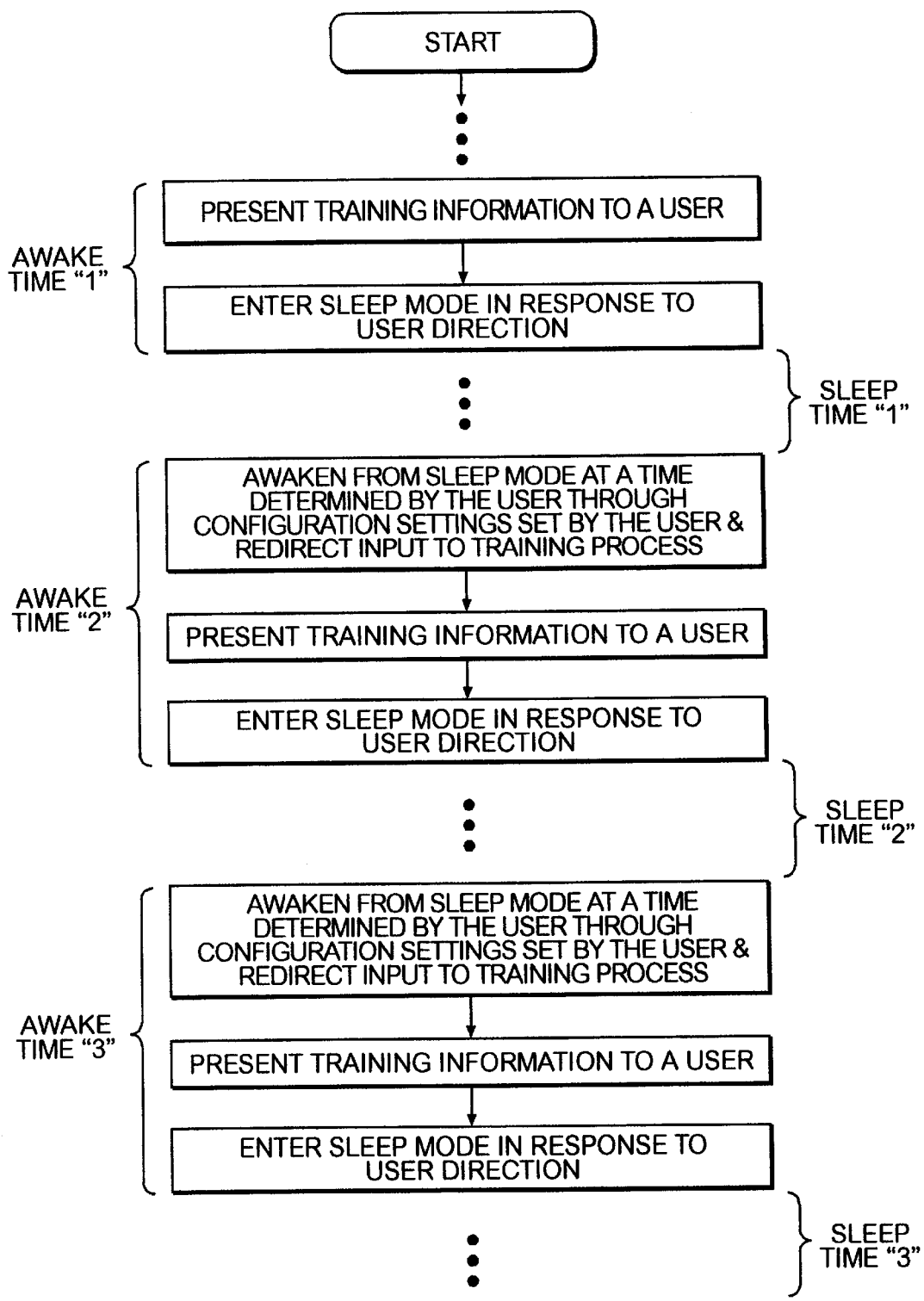
FIG. 2 is a schematic representation of the operating modes of a recurrent training user application of the recurrent training system of FIG. 1.
Figure 2B:
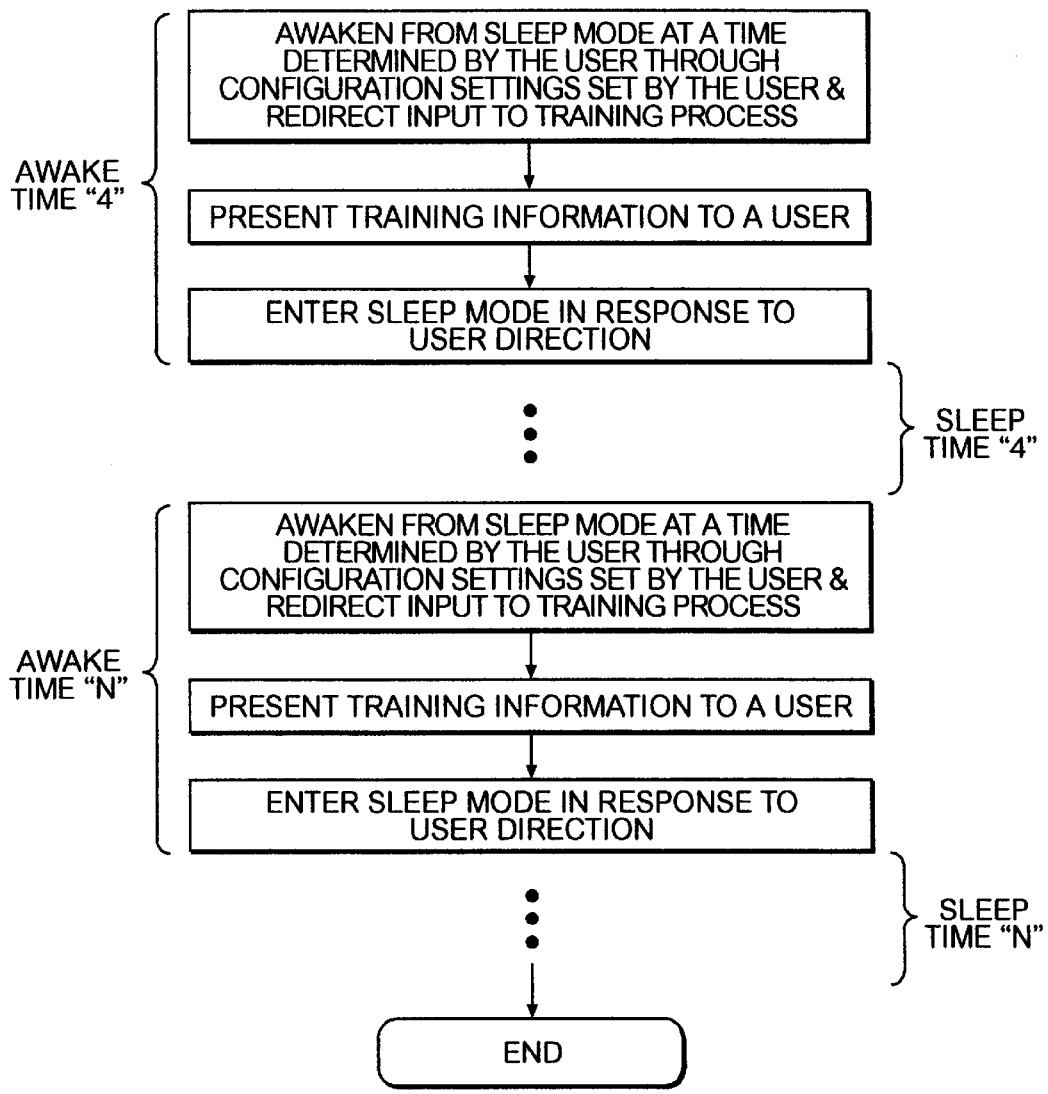

Referring now to the drawings, in which like numerals represent like components throughout the several views, FIG. 1 displays a pictorial representation of a recurrent training system 30 in accordance with the preferred embodiment of the present invention. The recurrent training system 30 comprises a computer system 32 which is configured with a program (i.e., the recurrent training user application 64 described below) that presents training information to a user of the program during training sessions, or "learning breaks", which are initiated by the computer system 32, under control of the recurrent training user application 64, at times previously determined and provided to the computer system 32 by the user in the form of offset or absolute times. In initiating a learning break, the recurrent training user application 64 interrupts interaction of the user with other programs and/or applications (and, in doing so, partially redirects input to itself) which are, prior the time of initiation of a learning break, receiving input from and providing output to the user, thereby reminding the user of the need to perform training and giving the user an opportunity to do so. Should the user desire to train upon being interrupted and, hence, take a learning break from other activities being performed on the computer system 32, the recurrent training user application 64, as illustrated schematically in FIG. 2, awakens from a "sleep" mode into an "awake" mode and enables the user to review training information while interacting with the user during a period of "awake" time. Once the user has reviewed a desired volume of training information and wishes to temporarily stop training, the recurrent training user application 64, upon direction by the user, ceases interaction with the user (i.e., thus ending the present learning break) and reenters its sleep mode for a period of "sleep" time during which the user interacts with other programs or applications executed by the computer system 32. The recurrent training user application 64 unobtrusively monitors time while in sleep mode until once again interrupting interaction of the user with other programs and/or applications at a time configured by the user. Because the learning breaks (and, hence, awake times) are, generally, initiated at "N" multiple times during a day and are interspersed with a sleep time, the learning breaks are said to "recur" at such times and are, therefore, sometimes referred to herein as "recurrent learning breaks" which take place at "recurrent times" to provide "recurrent training" to a user. Other supplementary programs of the recurrent training system 30 enable the building and maintenance of database (s) of training information accessed by the recurrent training user application 64 and enable the administration of the recurrent training system 30, including the maintenance of system and user-related information and the definition of which portions of the system's training information are to be made available for access by a user (i.e., thereby enabling the limitation of each user's access to only certain portions of the system's database(s) of training information) through interaction with various data files and data tables of the system 30.

Figure 3:
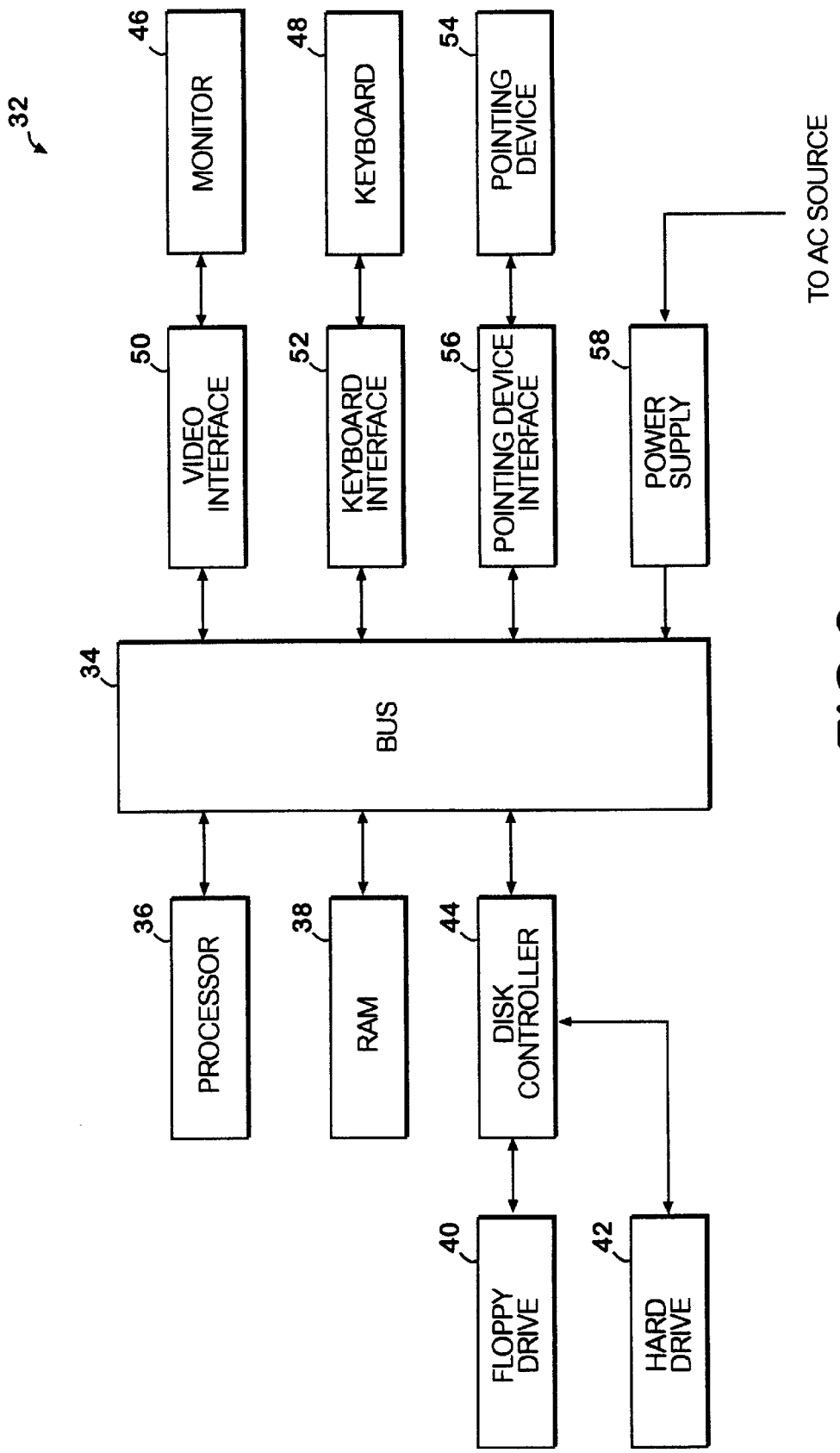
FIG. 3 is a block diagram representation of a computer system of the recurrent training system of FIG. 1.

The computer system 32, shown also in the block diagram representation of FIG. 3, comprises a bus 34 which connects directly to a central processing unit (CPU) 36 and a random access memory (RAM) 38. A floppy disk drive 40 and a hard disk drive 42 connect to the bus 34 via a disk controller 44 which directly interfaces with the bus 34. A monitor 46 and a keyboard 48 connect to the bus 34 through a video interface 50 and a keyboard interface 52, respectively. The bus 34 also connects to a pointing device 54, such as a mouse, via a pointing device interface 56. A power supply 58 connects to the bus 34 and to an alternating-current (AC), electrical energy source. Note that the above-described components cooperatively interface and function, as is well-known to those reasonably skilled in the art, to provide computing, data input/output, data storage, and data communication capabilities. An example of a computer system 32, acceptable in accordance with the preferred embodiment of the present invention, is a DeskPro 2000 computer manufactured by Compaq Computer Corporation of Houston, Tex. including and/or configured with the various components described above.

Figure 4:
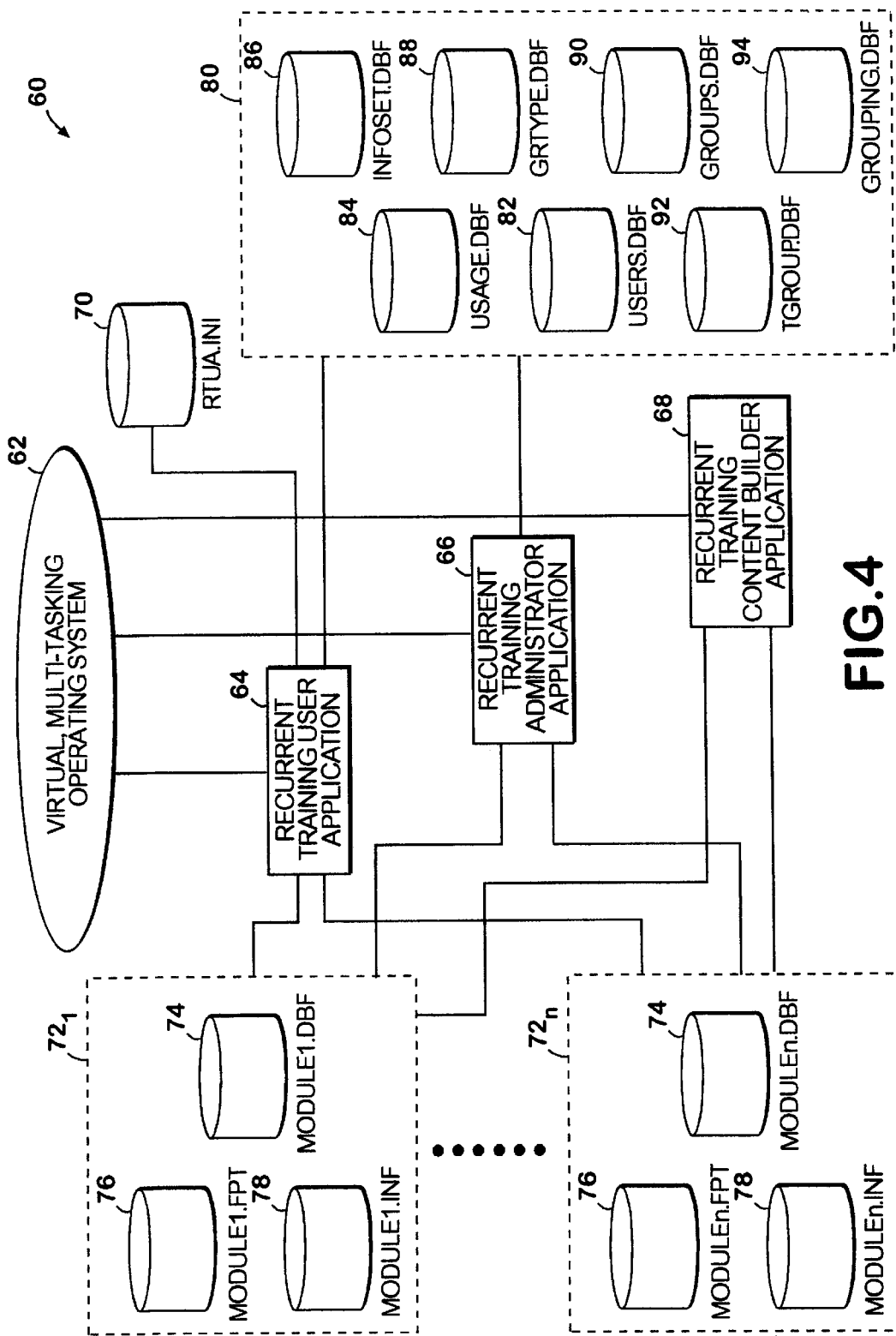
FIG. 4 is a block diagram representation of a process and data domain of the recurrent training system of FIG. 1.

FIG. 4 is a block diagram representation of a program and data domain 60 of the recurrent training system 30 according to the preferred embodiment of the present invention. The program and data domain 60 represents programming found on the computer system 32, which is executed by the computer system's CPU 36 using RAM 38, and data files and tables which are stored by the computer system's hard disk drive 42 and accessed, under program control, by the system's CPU 36. The connecting lines of FIG. 4 represent paths for the communication of data and control signals between the various programs and data files and/or data tables. The program and data domain 60 comprises a plurality of programs including a multi-tasking, virtual operating system 62, a recurrent training user application 64, a recurrent training administrator application 66, and a recurrent training content builder application 68.

In the preferred embodiment of the present invention, the operating system 62 includes a timer facility which enables a program to direct the creation of one or more software timers (referred to herein as "timers") by supplying a request to the operating system 62 that includes a name for identification of a timer to be created and a frequency parameter (i.e., a period of time). Once configured and started, a timer causes the continual, periodic generation and delivery of timer messages to the configuring program at intervals of time determined by the value of the frequency parameter. Each timer message delivered to the program includes the name of the timer which caused the generation of the timer message, thereby enabling the program to distinguish between messages associated with different timers and to handle messages from different timers appropriately. The timer facility also enables a program to direct the termination of a timer by supplying a termination instruction to the operating system 62. The operating system 62 also includes a clock facility which keeps the current time and which, upon request by a program, delivers the current time to the requesting program. The remaining facilities and operation of an operating system 62 should be known to one reasonably skilled in the art, as are the communication techniques employed to communicate data and control signals between the operating system 62 and other programs such as applications 64, 66, 68. One example of a multi-tasking, virtual operating system 62, having the above-described facilities and acceptable in accordance with the preferred embodiment of the present invention, is the Windows 95® operating system available from Microsoft Corporation, Inc. of Redmond, Wash.

The recurrent training user application 64, as briefly described above, executes on the computer system 32 in an "awake" mode and in a "sleep" mode while other programs, including the operating system 62 and/or various application programs (for example, spreadsheet application programs, database application programs, illustration application programs, etc.), also execute on the computer system 32. In the "awake" mode (i.e., during a learning break), the recurrent training user application 64 allows the user to select a training module 72 from a plurality of training modules 72, stored on hard disk drive 42, as a source of training information on a particular subject. Identification of which training modules 72 of the plurality of training modules 72 are available and/or accessible for selection by a particular user is made, by the recurrent training user application 64, through the reading and interpretation of data contained in system data tables 80 (described below). The establishment and maintenance of data in the system data tables 80 are performed by a training system administrator employing the recurrent training administrator application 66. Once the user has selected a training module 72, the recurrent training user application 64 presents individual pieces of training information (referred to herein as "Infobits") to the user, enabling the user to incrementally step forward or backward through the Infobits while reviewing the Infobits from the selected training module 72. The recurrent training user application 64, throughout such a learning break, tracks which training modules 72 have been accessed by the user and tracks the number of Infobits which have been presented to the user from the accessed training modules 72. Periodically, upon presentation of a threshold number of Infobits to a user (i.e., set by the training system administrator and stored in system data tables 80 through use of the recurrent training administrator application 66), the recurrent training user application 64 tests the user's knowledge of the subject matter of the Infobits by providing the user with a plurality of test questions having, for example, multiple choice or true/false answers and by tracking the total number of questions presented to the user and the number of correct answers provided by the user, both overall and on the most recent test.

Upon entering "sleep" mode, the recurrent training user application 64 configures the operating system 62 with a restore timer and, subsequently, receives timer messages associated with the restore timer (referred to herein as "restore timer messages") at roughly one minute intervals. While in "sleep" mode, the recurrent training user application 64 allows the user to interact with other programs and/or applications executing on the computer system 32 and unobtrusively tracks restore timer messages from the operating system 62 to determine the amount of time since entry into "sleep" mode (referred to herein as the "restore time waited"). The recurrent training user application 64 compares, after each receipt of a restore timer message if so configured by the user, the "restore time waited" to a period of desired sleep time (i.e., a period of time during which the recurrent training user application 64 remains in "sleep" mode), specified by the user during a prior "awake" time as an offset from the most recent time of entry into "sleep" mode, in order to determine whether to awaken from "sleep" mode. Alternatively, if so configured by the user, the recurrent training user application 64 compares the current time, after each receipt of a restore timer message, to a schedule of "wake-up" times established during, a prior "awake" time in order to determine whether to awaken from "sleep" mode. Note that should the user desire not to be disturbed (i.e., have interaction with other programs/applications interrupted by the recurrent training user application 64), the user may so configure the system during a previous "awake" time by specifying a period of time (referred to herein as a "do not disturb time") during which the recurrent training user application 64 should not awaken. The recurrent training user application 64 then compares the "restore time waited" to the "do not disturb time" in order to determine whether to awaken from "sleep" mode.

The program and data domain 60 of the recurrent training system 30 further comprises a plurality of data files and/or data tables associated with the recurrent training user application 64, including an initialization data file 70 denoted with the filename "KNOWDEV.INI" in FIG. 4. The initialization data file 70 stores data of various types which is accessed and utilized by the operating system 62 when the recurrent training user application 64 is first started by a user. The data contained in the initialization data file 70 enables the operating system 62 to configure operation of the recurrent training user application 64 within the operating system's environment. The use of such an initialization data file and the data stored therein is considered well-known to those reasonably skilled in the art of the present invention and, therefore, further discussion of the data stored by the initialization data file 70 is not necessary.

The recurrent training user application 64, as noted above, accesses training information, or Infobits, on a particular subject from a selected training module 72 of a plurality of training modules 72 (denoted 72$_1$–72$_n$) stored on hard disk drive 42. The training modules 72 are built and maintained by a content provider through use of the recurrent training content builder application 68. Each training module 72 stores Infobits associated with a single subject. As shown in FIG. 4, each training module 72 of the plurality of training modules 72 comprises three data tables which store data associated with each Infobit contained in the respective training module 72, including an Infobit base table 74 (denoted with the table name "MODULEn.DBF"), an Infobit detail table 76 (denoted with the table name "MODULEn.FPT"), and an Infobit attachments table 78 (denoted with the table name "MODULEn.INF").

The program and data domain 60 of the recurrent training system 30, as shown in FIG. 4, additionally comprises a plurality of system data tables 80 which are associated with and accessed by the recurrent training user application 64 and the recurrent training administrator application 66. The system data tables 80 include data that, among other things, identifies the training modules 72 available for use, specifies which training modules 72 are accessible to a particular user, and represents test results for the system's users. The exemplary system data tables 80 comprise: a user information table 82; a usage information table 84; a module information table 86; a tab set information table 88; a group information table 90; a module assignment table 92; and, a group assignment table 94.

The user information table 82 stores data which identifies users of the recurrent training system 30 and data pertaining to the testing of each user by the system 30. The user information table 82 includes a row of data for each user of the system 30 and, hence, each row of data in the user information table 82 is associated with a different system user. Each row of data comprises a user's name, a unique identifier corresponding to the user, a testing frequency for the user (i.e., specifies how often the system 30 tests the user during training), and a test extent for each test conducted by the system (i.e., specifies the number of questions included in each test).

The usage information table 84 stores information that enables evaluation of a user's training progress by keeping data, on a per training module 72 basis, such as how many Infobits the user has reviewed from a training module 72, how many questions the user has been asked with respect to a training module 72, how many questions the user answered correctly with respect to a training module, etc. Each row of the table 84 uniquely applies to a particular user and to a particular training module 72 accessed by the user. Therefore, the usage information table 84, generally, contains a plurality of rows of data for each user of the system 30, but each row associated with a user stores data regarding a different training module 72. Each row of data stored by the table 84 comprises: an identifier corresponding to a user (i.e., from the user information table 82); a module identifier (i.e., from the module information table 86); a pointer to the current Infobit of the training module 72 being reviewed by the user; the total number of Infobits of the training module 72 reviewed by the user to date; the total number of questions posed to the user to date for the training module 72; the total number of correct answers provided by the user to date for the training module 72; the number of questions posed to the user during the last test for the training module 72; and, the number of correct answers provided by the user during the last test related to the training module 72.

The module information table 86 contains data that uniquely identifies each training module 72 to the recurrent training user application 64, parameters that specify a path to a module's storage location, and parameters that relate to a module's usage. Each row of the module information table 86 uniquely corresponds in a one-to-one relationship to a different training module 72. Each row of data stored by table 86 includes: an identifier that uniquely identifies the training module 72 represented by the row; a path to the storage location of the module's data tables; caption text that appears on a tab (as described below); a status code that specifies whether or not the training module 72 is available for use by the recurrent training user application 64 and, hence, whether or not the module appears on a tab when the recurrent training user application 64 is executing in the "awake" mode; and, a test override code that specifies whether or not testing related to the training module 72 has been enabled or disabled by a training system administrator.

The tab set information table 88 stores information that uniquely identifies a set of tabs 114 (which are part of a user interface 100 discussed in more detail below) to the recurrent training user application 64 and, hence, uniquely identifies a set of training modules 72 since sets of tabs 114 and sets of training modules 72 are logically equivalent in the recurrent training system 30. Each row of the tab set information table 88 is associated with a single, yet different, set of tabs 114 or training modules 72. Each row of information stored by the tab set information table 88 comprises an identifier that uniquely identifies the group corresponding to the row and a tab set name (for example, "TRAINING") which appears in a tab set control 112 of the user interface for selection by a user.

The group information table 90 stores data which represents the assignment of a training module 72, to various groups. Note that a training module 72 is assignable to more than one group. Therefore, the group information table 90 often includes multiple assignments of a particular training module 72, to a plurality of groups. Each row of the group information table 90 corresponds to a single assignment of a training module 72, to a group. The columns of each row of the group information table 90 include: an identifier which identifies a group; a name corresponding to the identified group; and, an identifier (i.e., from the tab set information table 88) which identifies a set of tabs 114, or training modules 72, as being assigned to the identified group.

The module assignment table 92 stores information that specifies which training modules 72 are assigned to a group. Each row of table 92 represents an assignment of a training module 72 to a group and includes an identifier (i.e., from the module information table 86) which identifies a training module 72 and an identifier (i.e., from the group information table 90) which identifies a group.

The group assignment table 94 stores data which associates groups and users of the recurrent training system 30. Note that more than one group is assignable to a user and that each row of table 94 corresponds to one such assignment. Therefore, the group assignment table 94 frequently contains multiple group assignments and, hence, multiple rows of data for a particular user. Each row of the group assignment table 94 includes an identifier (i.e., from the group information table 90) which identifies a group and an associated identifier (i.e., from the user information table 82) which uniquely identifies the user to which the group is assigned.

Figure 5:
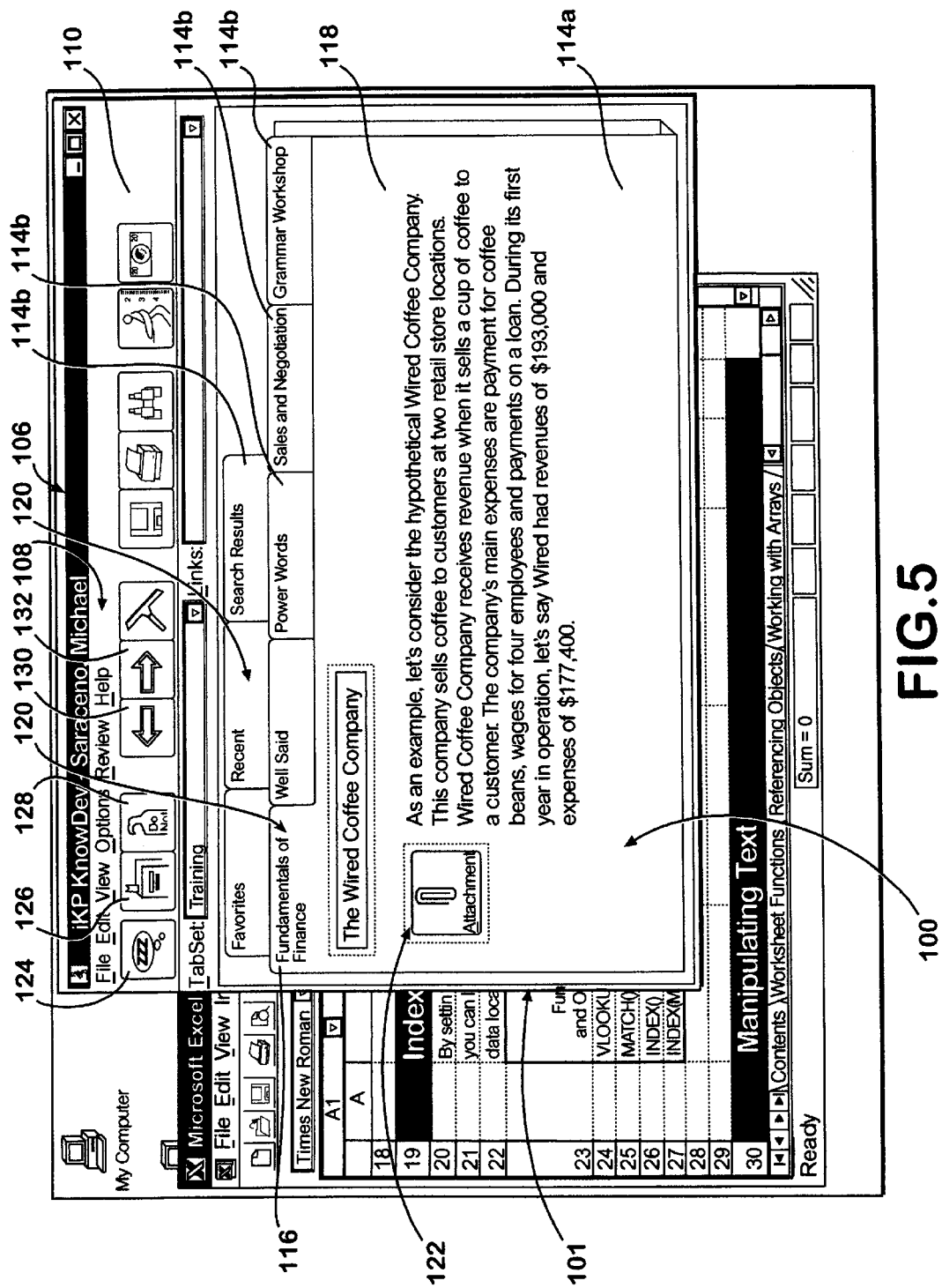
FIG. 5 is a pictorial representation of a computer monitor screen showing a recurrent training user application of the recurrent training system of FIG. 1 executing in a window cascaded atop an application program window in which a spreadsheet application program executes.
Figure 6:
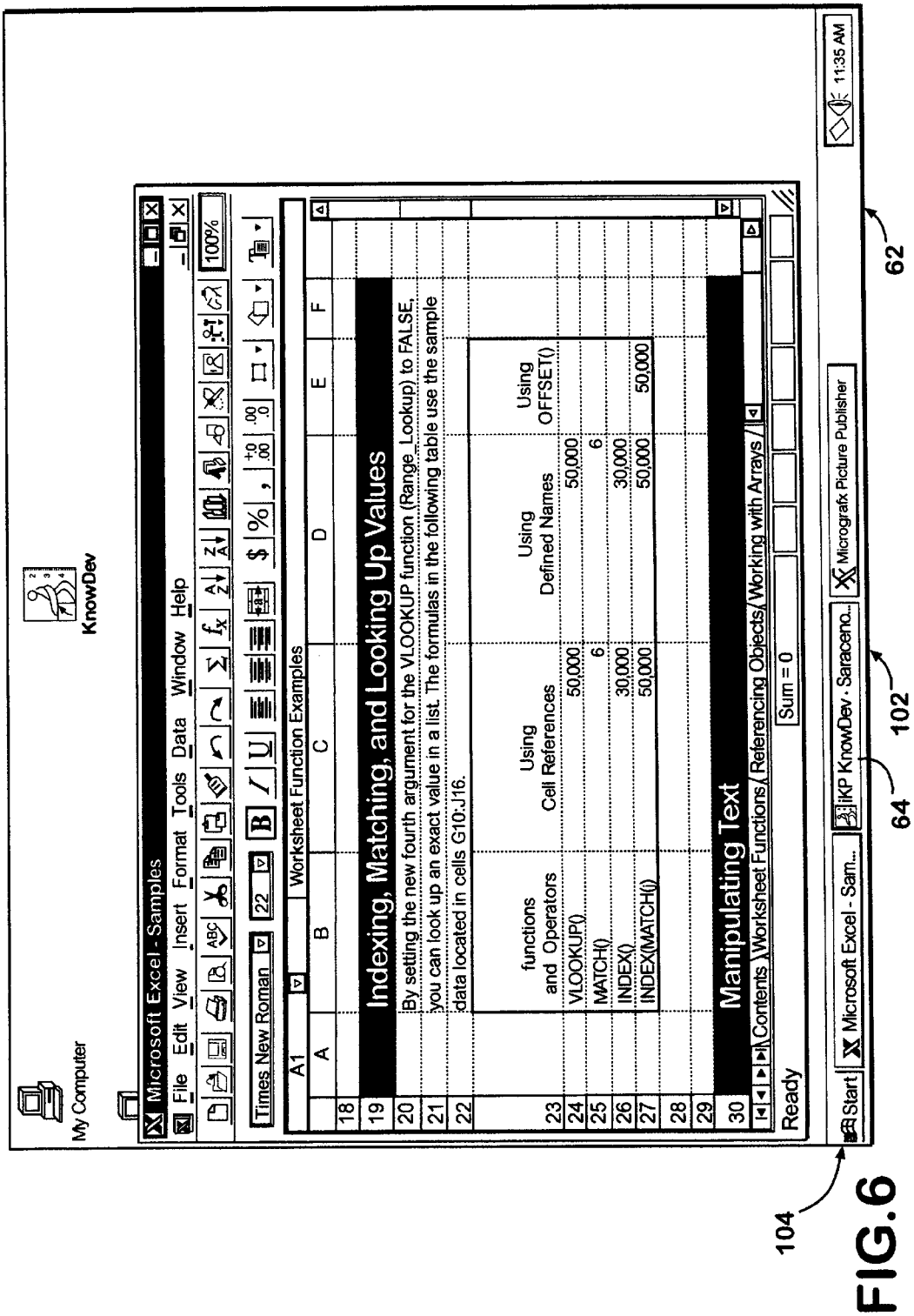
FIG. 6 is a pictorial representation of a computer monitor screen showing the recurrent training user application of FIG. 5 executing in a minimized form.

According to the preferred embodiment of the present invention, the recurrent training user application 64 executes in cooperation with a "windows-type" operating system 62, such as the Windows 95® operating system, and presents Infobits and various selectable options to the user through a user interface 100 (see FIG. 5) which is visible in a window 101 (also referred to herein as main process window 101) on the monitor 46 of computer system 32. The user interface 100 is visible when the recurrent training user application 64 operates in the "awake"mode, either because the user has recently begun execution of the application 64 or because the application 64 has recently awakened from its "sleep" mode. As shown respectively in FIGS. 5 and 6, the user interface 100 is visible when the recurrent training user application 64 executes in the "awake" mode, but is not visible when the recurrent training user application 64 executes in the "sleep" mode (during which the main process window 101 and the user interface 100 are "minimized" and execution of the recurrent training user application 64 is indicated by an entry 102 on status bar 104 of the operating system 62). Note that, as shown in FIGS. 5 and 6, the recurrent training user application 64 executes, in either mode, while other programs (i.e., other application programs or the operating system 62) also execute on the computer system 32 either in windows of their own or with their user interfaces minimized as indicated by entries on status bar 104.

Figure 7:
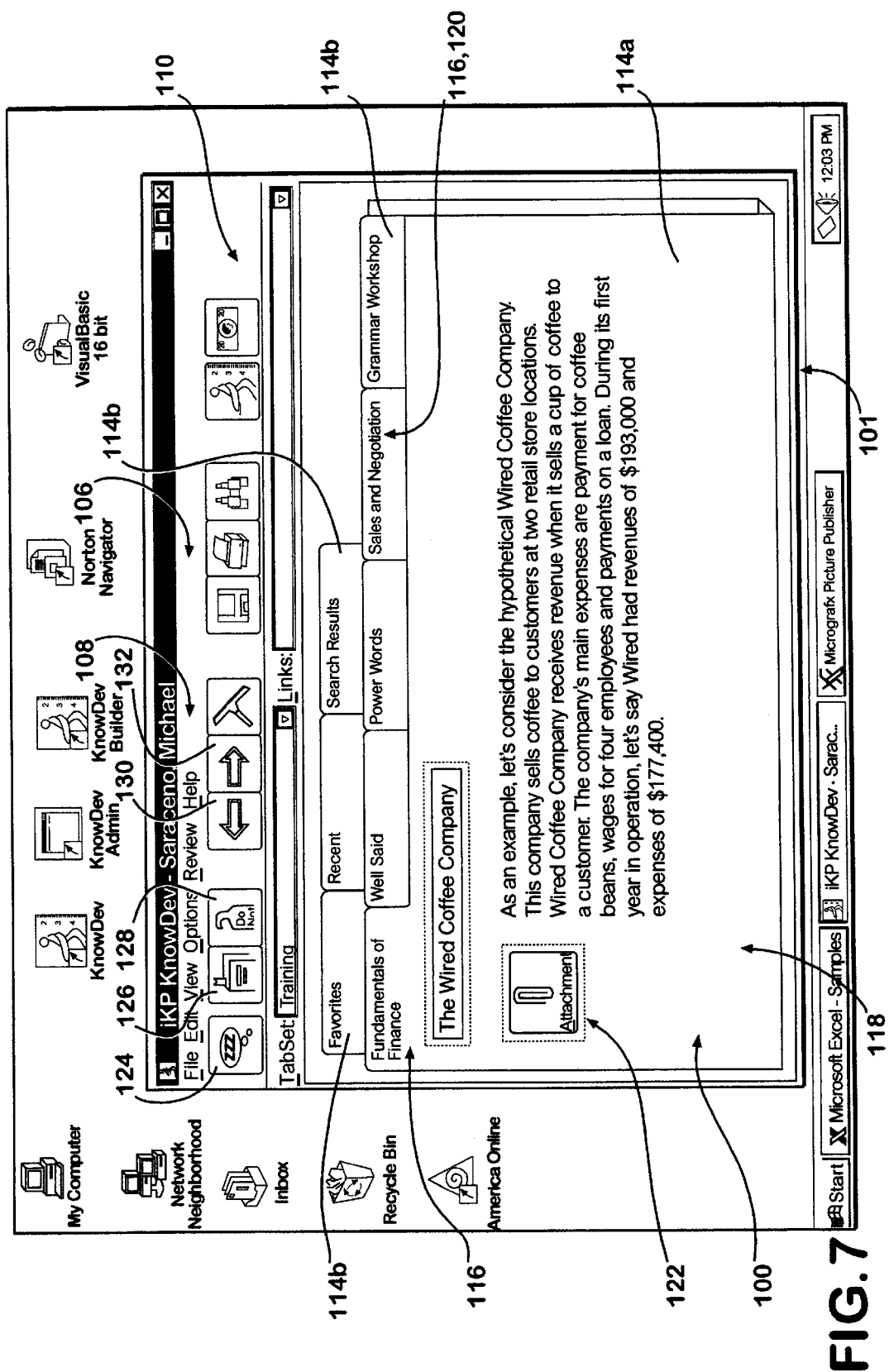
FIG. 7 is a pictorial representation of a computer monitor screen of the recurrent training user application of FIG. 5 executing in a window with no other application programs executing in similar windows.

The user interface 100 of the recurrent training user application 64, as displayed in FIG. 7, comprises a title bar 106 which shows the name of the user currently being trained, a menu bar 108 having a plurality of keywords (i.e., File, Edit. View, Options, Review, Help) which, upon selection, each cause a different pull-down menu to become accessible to the user, and a button bar 110 having a plurality of buttons which, upon selection, each cause the performance of a different action by the recurrent training user application 64. The user interface 100 further comprises a plurality of cascaded tabs 114 with each tab 114 of the plurality of tabs 114 corresponding, in a one-to-one relationship, with a training module 72 identified in the module information table 86. In order for a tab 114 to be displayed by the recurrent training user application 64, the tab 114 must have a status code in the module information table 86 which indicates that the training module 72 is available for use. Each tab 114 has an upper portion 116 and a lower portion 118. The upper portion 116 of each tab 114 extends from and is visible above the lower portion 118. The upper portion 116 of each tab 114 includes a caption text control 120 that displays caption text, from the module information table 86, for the training module 72 represented by the tab 114. The lower portion 118 of each tab 114 displays, at appropriate times, an Infobit read from data tables 74, 76, 78 of the training module 72 which is associated with the tab 114. The lower portion 118 of each tab 114 has an attachment control button 122 which, upon selection by a user and upon attachment files being available, causes the recurrent training user application 64 to launch the file(s) (i.e., representing an attachment associated with the current Infobit), from the attachments table 78 of the training module 72, on the tab 114.

As illustrated in FIG. 7, the button bar 110 comprises a "sleep" button 124, a "bookmark"button 126, and a "do not disturb" button 128. The "sleep" button 124, when selected by the user (typically, with the pointing device 54), initiates execution of a sleep button sub-process 790 (described in greater detail below) which causes the recurrent training user application 64 to, ultimately, enter "sleep" mode. However, prior to causing the recurrent training user application 64 to enter "sleep" mode, the sleep sub-process 790 causes the sequential reading of the next Infobit available (for every tab previously accessed) from the training module 72. After reading the next Infobit, the lower portion 118 of the foreground tab 114a is updated with the text of the Infobit and the main process window 101 (and, hence, user interface 100) is then minimized (i.e., putting the recurrent training user application 64 into "sleep" mode) with the recurrent training user application 64 continuing to execute, but visible and identifiable only as an entry 102 on status bar 104 of the operating system 62 until the recurrent training user application 64 awakens. Upon selection by the user, the "bookmark" button 126 starts execution of a bookmark button sub-process 820 (described in greater detail below) of the recurrent training user application 64 which, like the sleep button sub-process 790, minimizes the main process window 101 and user interface 100 to place the recurrent training user application 64 into "sleep" mode, but unlike the sleep button sub-process 790, does not cause updating of the lower portion 118 of any tab 114a with the next Infobit available from the associated training module 72.

The "do not disturb" button 128, when selected by the user, initiates execution of a do not disturb button sub-process 850 (described in greater detail below) of the recurrent training user application 64 which minimizes the main process window 101 and user interface 100, placing the recurrent training user application 64 into "sleep" mode for a period of time (i.e., the "do not disturb time" described herein) during which the recurrent training user application 64 does not awaken. Once the "do not disturb time" expires, the sleep sub-process 960 (described below) causes the recurrent training user application 64 to awaken.

The button bar 110, as seen in FIG. 7, further comprises a "previous Infobit" button 130 and a "next Infobit" button 132. The "previous Infobit" button 130, upon selection by the user, causes the recurrent training user application 64 to read the previous Infobit available from the training module 72 which is associated with the foreground tab 114a and to update the lower portion 118 of the foreground tab 114a with the text of the Infobit read. The "next Infobit" button 132, in response to selection by the user, initiates execution of a next button sub-process 880 which causes the recurrent training user application 64 to read the next Infobit available from the training module 72 associated with the foreground tab 114a and to update the lower portion 118 of the foreground tab 114a with the text of the Infobit read. However, prior to updating foreground tab 114a, the next button sub-process 880 determines whether it is time to conduct testing of the user (i.e., based upon the test frequency from the user information table 82 the number of Infobits reviewed from the usage information table 84) and ascertains whether the user is ready to take a test. If it is time to conduct a test and the user is ready, a test is conducted. If it is time to conduct a test and the user is not ready, testing is delayed for a period of time (referred to herein as the "test wait time") input by the user. If it is not time to conduct a test, no testing is conducted and updating of the foreground tab 114a is the only substantive action taken by the recurrent training user application 64.

Figure 8:
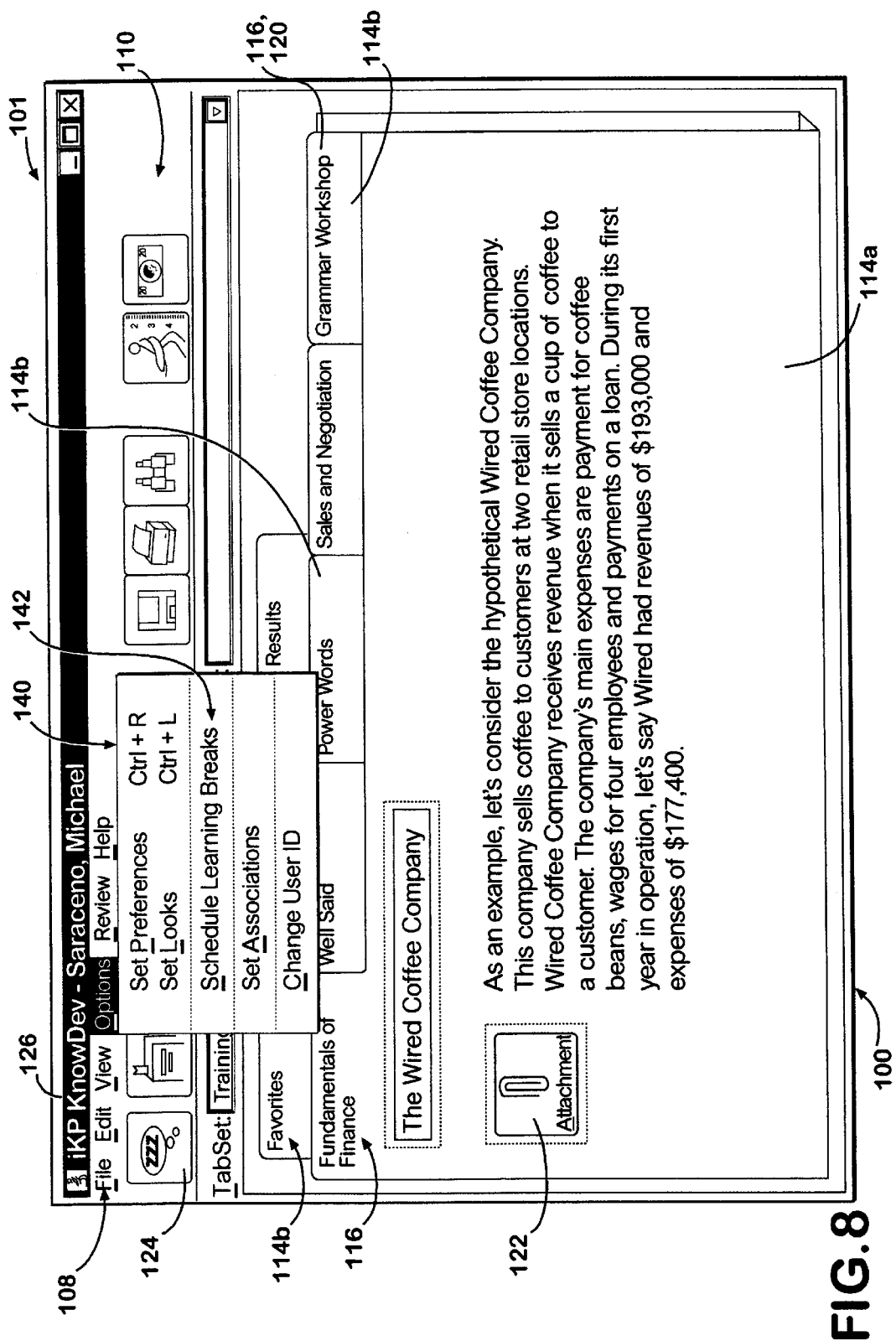
FIG. 8 is a pictorial representation of a computer monitor screen showing an "Options" pull-down menu of the recurrent training user application of FIG. 5.

In accordance with the preferred embodiment of the present invention, the user interface 100 additionally comprises an "Options" pull-down menu 140 (see FIG. 8) which the recurrent training user application 64 displays when the user selects the "Options" keyword from menu bar 108. The "Options" pull-down menu 140 includes a plurality of selections from which the user may choose, including a "Schedule Learning Breaks" selection 142 which, when chosen, causes the recurrent training user application 64 to display the "Schedule Learning Breaks" menu 144 seen in FIG. 9. The "Schedule Learning Breaks" menu 144 has a plurality of configuration controls which enable a user to specify configuration settings to the recurrent training user application 64 that determine when the application 64 awakens from "sleep" mode.

The "Schedule Learning Breaks" menu 144 comprises a schedule type control 146, a sleep time control 148, and a do not disturb time control 150 which receive input values/settings (referred to herein, respectively, as the "schedule type", the "sleep time", and the "do not disturb time") from a user and store the values/settings at associated storage locations in RAM 38 described below. The schedule type control 146 provides a user with three options, the selection of which determines the configuration settings employed by the recurrent training user application 64 when determining a time to awaken from "sleep" mode. Selection of the first option, "Use Sleep Timers", instructs the recurrent training user application 64 to use only the sleep time configuration setting received from a user via the sleep time control 148. With such a selection in effect, the recurrent training user application 64, whenever it enters "sleep" mode, determines a time at which to awaken from "sleep" mode by adding the sleep time to the time at which the recurrent training user application 64 was most recently put into "sleep" mode. Choice of the second option, "Use Schedule", instructs the recurrent training user application 64 to use only scheduled "wake-up" times (the setting of which is discussed below) in determining when to awaken from "sleep" mode, thereby causing the recurrent training user application 64, if in "sleep" mode when the current time matches any scheduled "wake-up" time, to awaken from "sleep" mode. Selection of the third option, "Use Both", instructs the recurrent training user application 64 to utilize both the sleep time received by the sleep time control 148 and any scheduled "wake-up" times as described respectively above in determining when to awake from "sleep" mode. Regardless of which option is selected from the schedule type control 146, if a user desires not to perform training and desires not to have interaction with other executing computer programs of the computer system 32 interrupted by the recurrent training user application 64 for a desired period of time, the user inputs the period of time (i.e., the "do not disturb time") into the do not disturb control 150 and subsequently instructs the recurrent training user application 64 by selecting the do not disturb button 128 to enter "sleep" mode. Once in "sleep" mode, the recurrent training user application 64 will not awaken until, at least, a time determined by adding the do not disturb time to the time at which the recurrent training user application 64 was put into "sleep" mode by selection of the do not disturb button 128.

Figure 9:
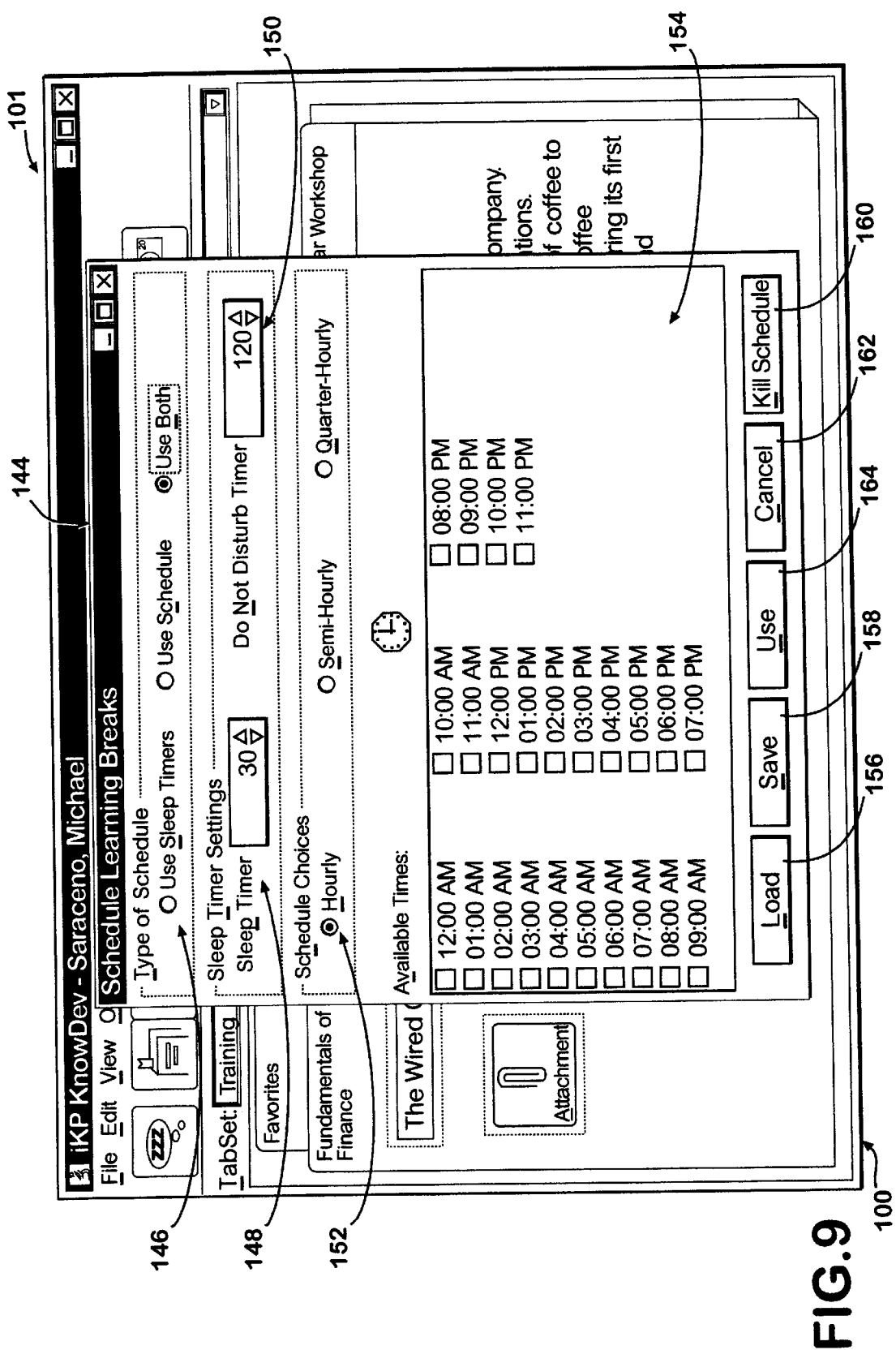
FIG. 9 is a pictorial representation of a computer monitor screen showing a "Schedule Learning Breaks" menu of the recurrent training user application of FIG. 5.

The "Schedule Learning Breaks" menu 144, as shown in FIG. 9, also comprises a schedule choice control 152 and a list of available "wake-up" times 154 which, similar to the other controls described above, receive input configuration settings from a user and store the configuration settings at associated storage locations in RAM 38 (described below). The schedule choice control 152 presents hourly, semi-hourly, and quarterly-hourly options to a user and enables the user, by selecting one of the options, to instruct the recurrent training user application 64 to present "wake-up" times in the list of available "wake-up" times 154 which are offset relative to one another by an appropriate period of time for the selected option. The user may then create and/or edit the list, or schedule, of available "wake-up" times 154 by selecting/deselecting desired "wake-up" times, typically, with the pointing device 54. The recurrent training user application 64 utilizes the selected "wake-up" times when in "sleep" mode, as described above, to determine when to awaken from "sleep" mode if the user has also selected either of the "Use Schedule" or the "Use Both" options/settings of the schedule type control 146.

The "Schedule Learning Breaks" menu 144 additionally comprises a plurality of buttons, including a "Load" button 156, a "Save" button 158, a "Reset" button 160, a "Cancel" button 162, and a "Use" button 164, which are selectable by a user. Selection of the "Load" button 156 by a user instructs the recurrent training user application 64 to prompt for and receive a name of a data file which stores a previously created schedule of "wake-up" times and, upon locating the file, to read the "wake-up" times from the data file into RAM 38 and to display the schedule as a list of available "wake-up" times 154 for possible editing by the user. The "Save" button 158, when selected by a user, causes the recurrent training user application 64 to prompt for and receive a name of a data file in which to store the displayed list of available "wake-up" times 154 and, upon receiving a name, to create a data file having the provided name and then to store the list of available "wake-up" times in the created data file. In response to selection of the "Reset" button 160 by a user, the recurrent training user application 64 deselects, or clears, any "wake-up" times which have been selected by the user as shown in the displayed list of available "wake-up" times 154. The "Cancel" button 162, upon selection by a user, causes the recurrent training user application 64 to close the "Schedule Learning Breaks" menu 144 without storing any edits made to any of the controls by the user. Alternatively, selection of the "Use" button 164 by a user instructs the recurrent training user application 64 to close the "Schedule Learning Breaks" menu 144, but to employ the configuration settings, as currently stored in RAM 38, in determining when to awaken from "sleep" mode.

Figure 10:
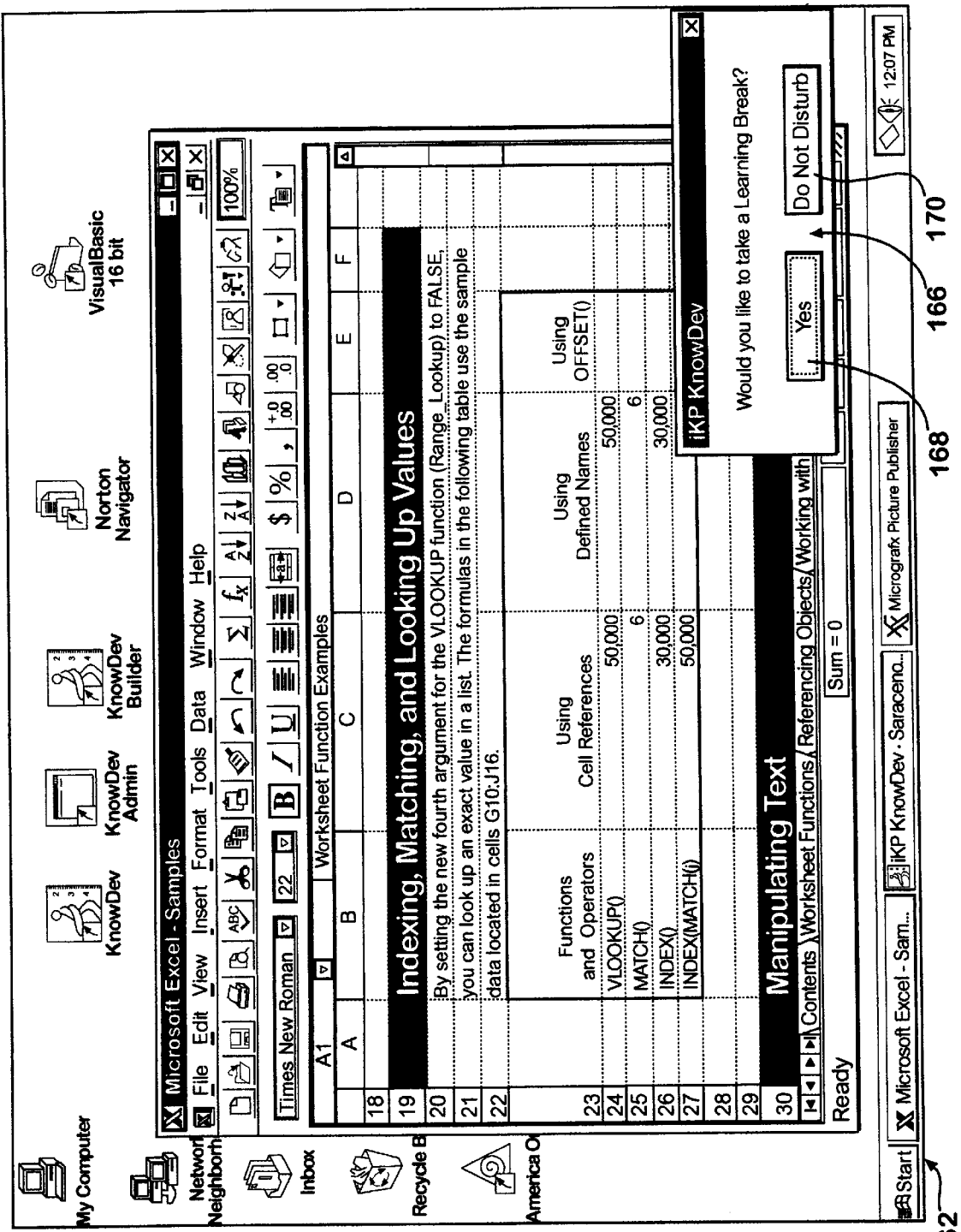
FIG. 10 is a pictorial representation of a computer monitor screen showing a dialog box of the recurrent training user application of FIG. 5.

According to the preferred embodiment of the present invention, the recurrent training system 30 further comprises a pop-up dialog box 166 (see FIG. 10) which is displayed (as described below if a prompt before display configuration option is set to "true") when the recurrent training user application 64 determines that it is time to awaken from "sleep" mode. The dialog box 166 reminds a user of the need to train by displaying a prompt question, for reading by the system's user, asking whether or not the user wishes to perform training. The dialog box 166 comprises a "Yes" button 168 and a "Do Not Disturb" button 170. Selection of the "Yes" button 168 by the user, instructs the recurrent training user application 64 to immediately display the user interface 100 so that the user can review Infobits and/or answer test questions. Selection of the "Do Not Disturb" button 170 by the user, instructs the recurrent training user application 64 to reenter "sleep" mode and not to awaken for the period of "do not disturb time" specified in the do not disturb control 150 of the "Schedule Learning Breaks" menu 144. If the prompt before display configuration option is set to "false", the recurrent training user application 64 immediately displays the user interface 100 when it determines that it is time to awaken from "sleep" mode.

Figure 11:
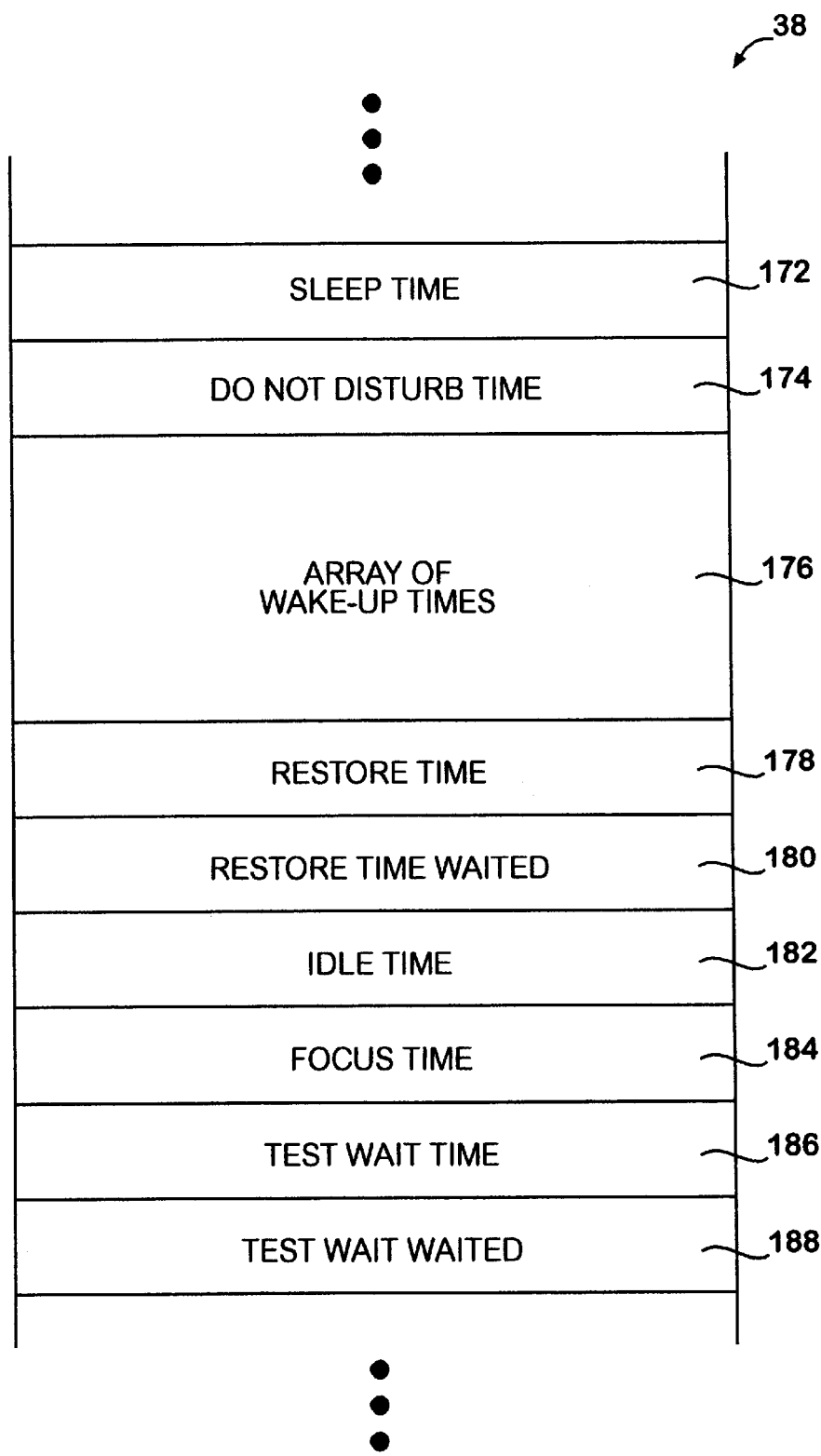
FIG. 11 is a schematic representation of a partial memory map of the recurrent training user application of FIG. 5.

FIG. 11 schematically illustrates a portion of RAM 38 which stores values and/or settings for a plurality of variables utilized by the recurrent training user application 64 during execution. The portion of RAM 38 comprises a first pair of memory locations 172, 174 which respectively store values of the sleep time and do not disturb time variables that are received by the sleep time control 148 and the do not disturb time control 150, respectively, of the "Schedule Learning Breaks" menu 144. The sleep time and do not disturb time variables are used by the recurrent training user application 64 to determine when to awaken from "sleep" mode. The portion of RAM 38 further comprises a plurality of memory locations 176 which store an array of wake-up times representative of the wake-up times displayed in the schedule of wake-up times 154 on the "Schedule Learning Breaks" menu 144. The array of wake-up times is, like the values of the sleep time and do not disturb variables, employed by the recurrent training user application 64, as described herein, to determine when to awaken from "sleep" mode.

RAM 38, as illustrated in FIG. 11, also includes a pair of memory locations 178, 180 which respectively store values of restore time and restore time waited variables. The value of the restore time variable represents a period of time that must be waited before the recurrent training user application 64 awakens from "sleep" mode (i.e., if the schedule type control 146 is set to "Use Sleep Timer" or to "Use Both") and is, generally, set to either the value of the sleep time variable or the value of the do not disturb time variable (i.e., when the user has selected the do not disturb button 128 to place the recurrent training user application 64 into "sleep" mode and, thereby to prevent awakening of the recurrent training user application 64 for a period of time corresponding to the do not disturb time). The value of the restore time waited variable is incremented by one minute, as described below, whenever a restore timer message is received from the operating system 62 and represents the amount of time that has been waited by the recurrent training user application 64 since being placed in "sleep" mode. A comparison of the value of the restore time waited variable and the value of the restore time variable is employed by the recurrent training user application 64, as described below, to determine whether to awaken from "sleep" mode when the schedule type control 146 is not set to "Use Schedule".

The portion of RAM 38, as seen in FIG. 11, further comprises a pair of memory locations 182, 184 which respectively store values of an idle time variable and a focus time variable. The value of the idle time variable represents the amount of time that the recurrent training user application 64 has been idle (i.e., no user interaction has occurred with the recurrent training user application 64) while in "awake" mode and is incremented by one minute upon receipt of an idle timer message from the operating system 62 as described below. The value of the focus time variable represents the amount of time that has expired upon loss of the focus of the operating system 62 due to minimization of the main process window 101 by the user or due to interaction, by the user, with another program. The focus time variable is incremented by one minute, as described below, upon receipt of a focus timer message from the operating system 62. Should the values of the idle time variable or the focus time variable, at any time while the recurrent training user application 64 operates in "awake" mode, be greater than two times the current value of the sleep time variable, the recurrent training user application 64 places itself into "sleep" mode.

RAM 38 additionally comprises memory locations 186, 188 which respectively store the values of a test wait time variable and a test time waited variable. The value of the test wait time variable represents an amount of time for which a user wishes to delay testing upon being informed, by the recurrent training user application 64, that it is time to perform a test. The value of the test time waited variable represents an amount of time waited by the recurrent training user application 64 since informing the user that it is time to perform a test. The value of the test time waited variable is incremented by one minute, as described below, when the recurrent training user application 64 receives a test timer message from the operating system 62. Should the value of the test time waited variable exceed the value of the test wait time variable while the recurrent training user application 64 operates in "awake" mode, the recurrent training user application 64 initiates testing of the user.

Figure 12:
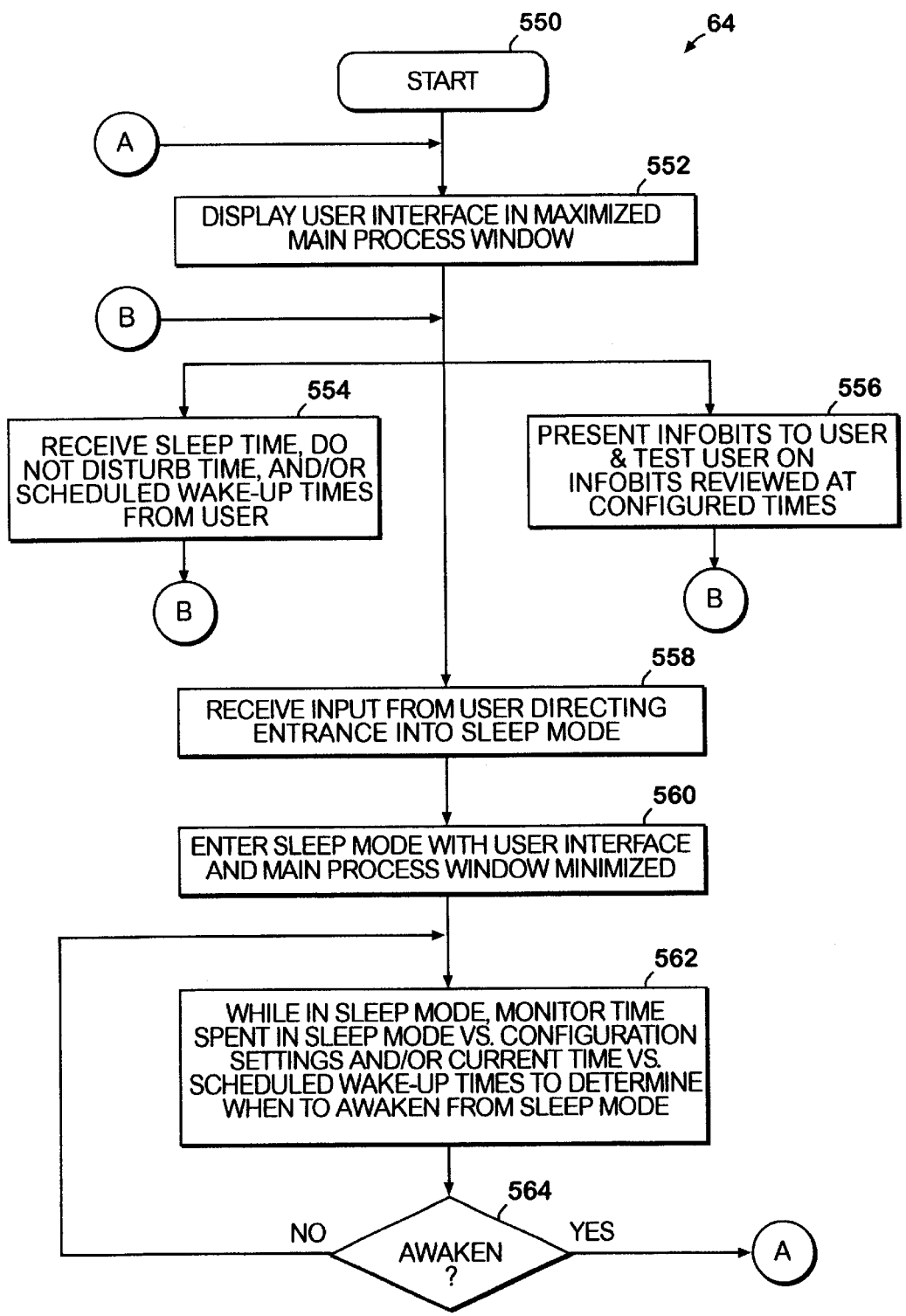
FIG. 12 is a flowchart representation of an overview of the recurrent training user application of FIG. 5.
Figure 13A:
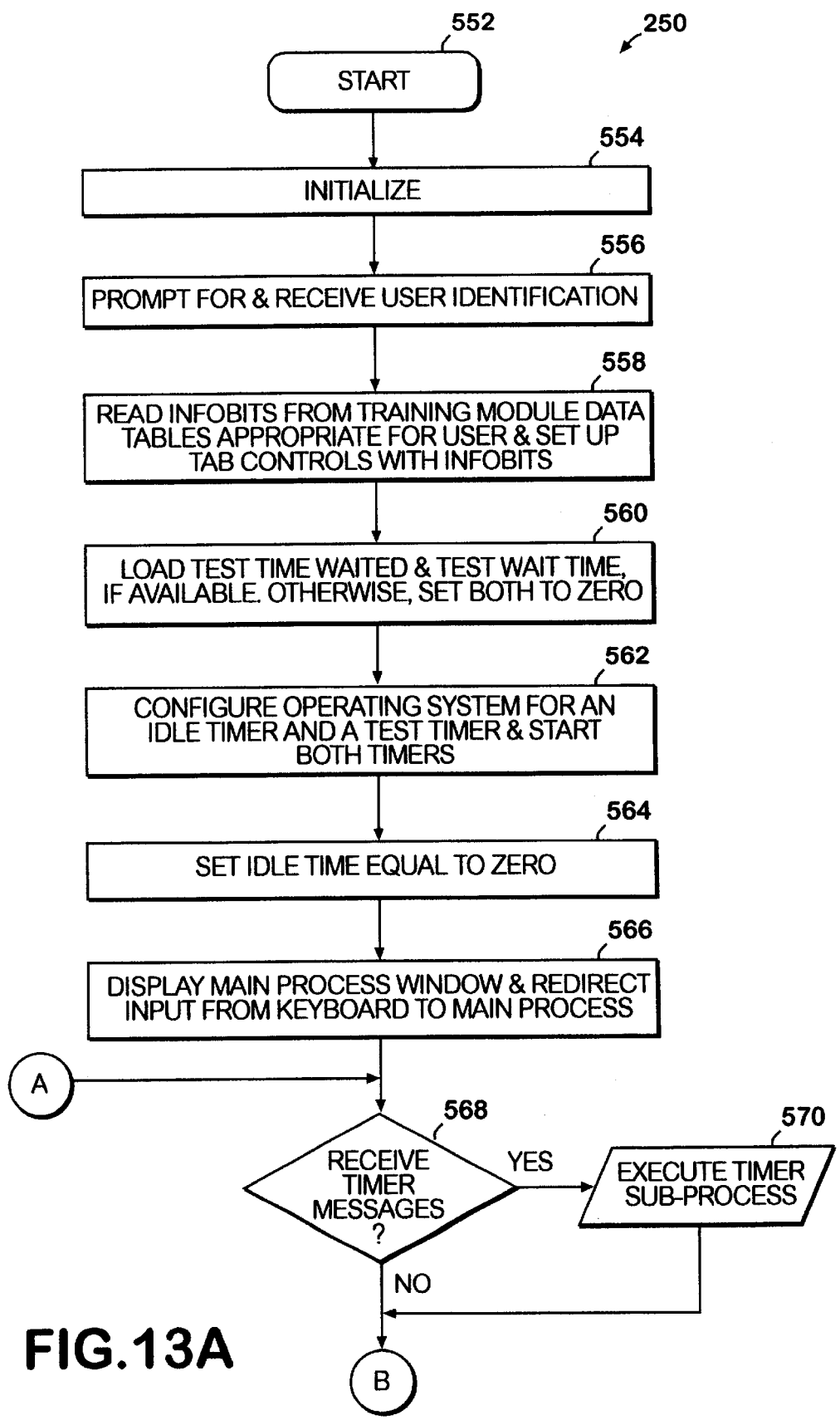
FIG. 13 is a flowchart representation of a main process of the recurrent training user application of FIG. 5.
Figure 13B:
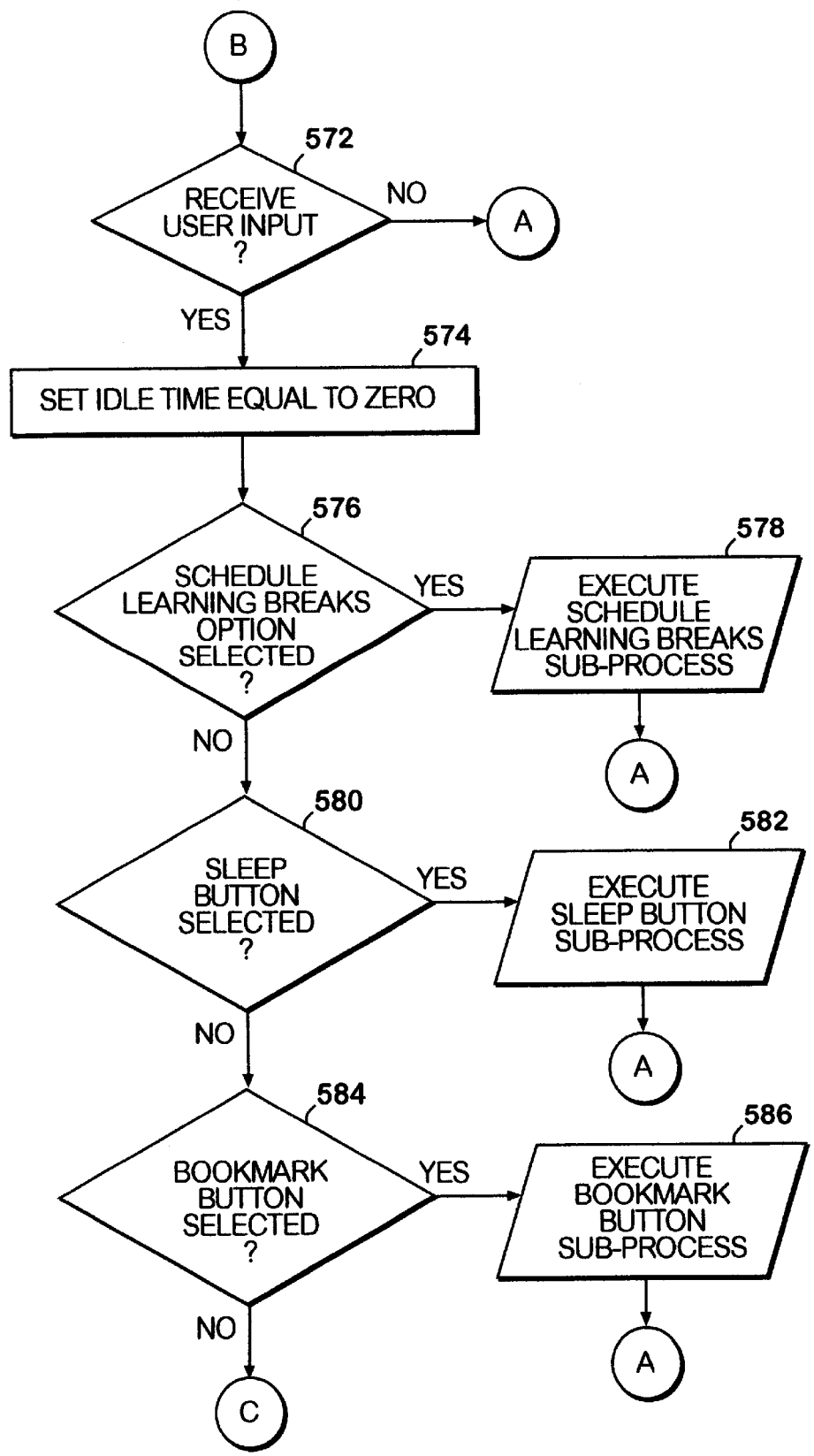
Figure 13C:
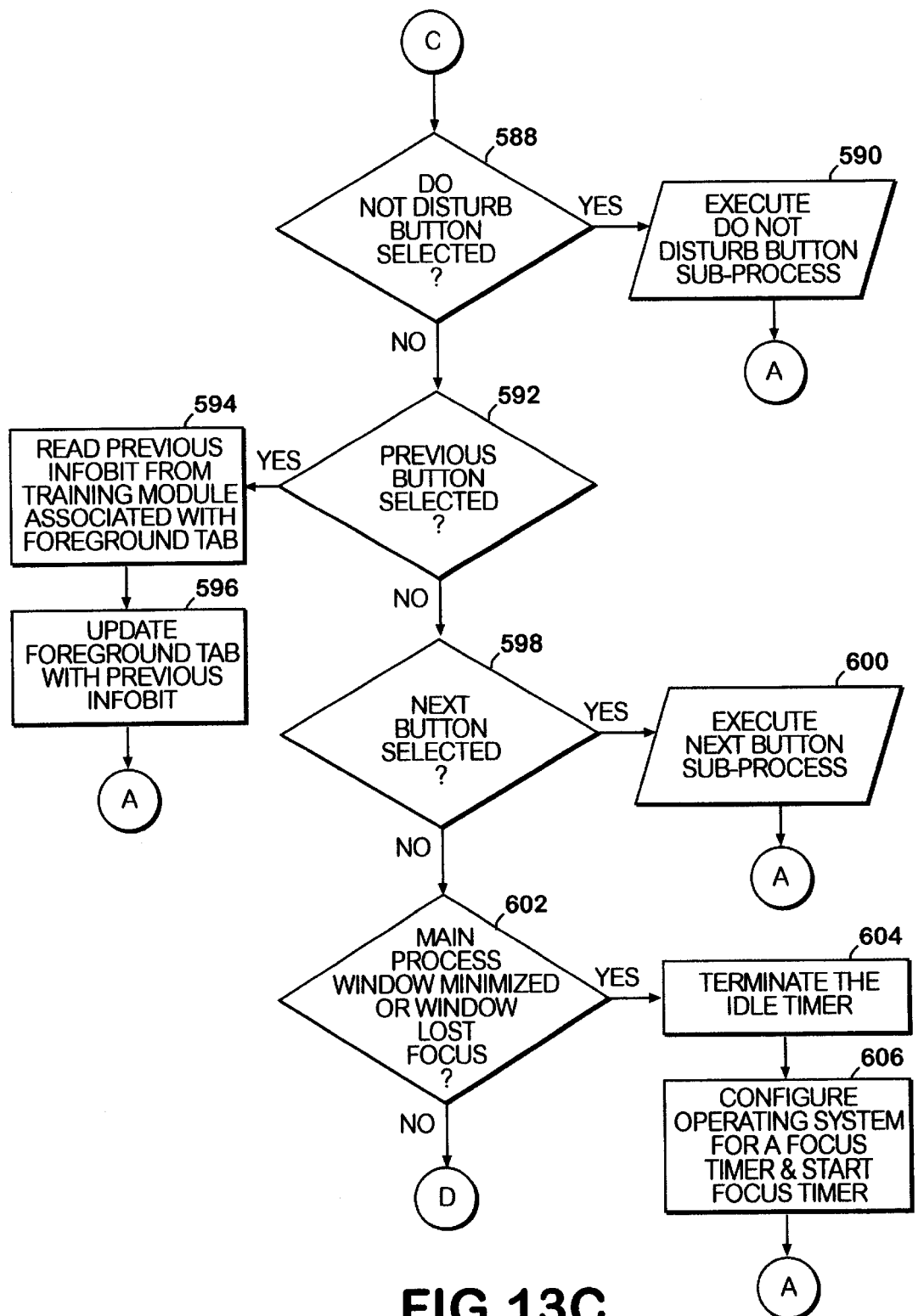
Figure 13D:
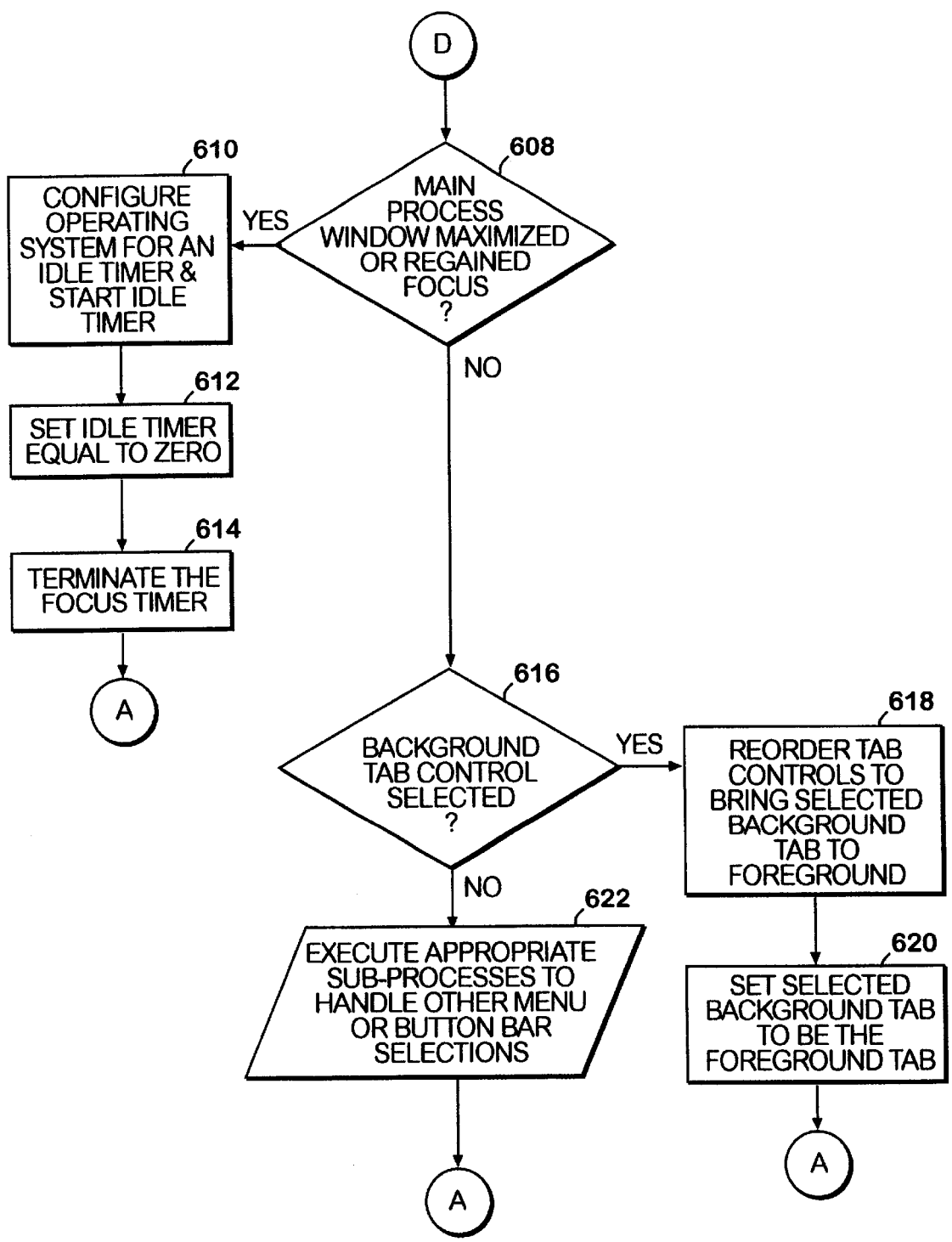

FIGS. 12–21 are flowchart representations of steps, in accordance with a preferred method of the preferred embodiment of the present invention, taken by the recurrent training system 30 while executing the recurrent training user application 64. FIG. 12 displays an overview of the major steps taken by the recurrent training user application 64 in order to provide recurrent training to a user of the recurrent training system 30. FIGS. 13–21 display the steps of a main process 550 of the recurrent training user application 64 and the steps of a plurality of sub-processes of the recurrent training user application 64, including a timer sub-process 640, a schedule learning breaks sub-process 720, a sleep button sub-process 790, a bookmark button sub-process 820, a do not disturb button sub-process 850, a next button sub-process 880, a test sub-process 930, and a sleep sub-process 960, which are taken by the recurrent training user application 64 during execution on the computer system 32.

The recurrent training user application 64, as displayed in the overview flowchart of FIG. 12, starts at step 500 and advances to step 552 where the computer system 32 displays the user interface 100 in an enlarged main process window 101 on monitor 46. Once the user interface 100 is displayed, the computer system 32 performs three major functions as represented by the three major different branches of the flowchart. First, the computer system 32, as indicated at step 554, receives sleep time, do not disturb time, and/or scheduled "wake-up" times from the user by presenting the user, in response to input from the user, with the "Schedule Learning Breaks" menu 144 and then waiting for inputs from the user. Receipt of the sleep time, do not disturb time, and/or scheduled "wake-up" times (in addition, to several other related inputs) from the user configures the recurrent training user application 64 with the information necessary to determine when the user desires for it to awaken from "sleep" mode after being previously placed into "sleep" mode by the user. Second, the computer system 32, as indicated at step 556, presents Infobits to the user for review and, at an appropriate time, tests the user on the training information of the Infobits which have been presented to the user. Third, the computer system 32, as indicated at step 558, receives an input (i.e., via the sleep button 124, the bookmark button 126, or the do not disturb button 128) from the user which directs the recurrent training user application 64 to enter into "sleep" mode. Upon receiving such direction, the computer system 32 minimizes the user interface 100 and the main process window 101 and conducts other tasks necessary to place the recurrent training user application 64 into "sleep" mode at step 560. Then, as noted at step 562, the recurrent training user application 64 continually monitors, according to the configuration parameters supplied at step 554, the time that it has spent in "sleep" mode versus the configuration settings provided by the user via the "Schedule Learning Breaks" menu 144 and/or the current time versus scheduled "wake-up" times in order to determine when to awaken from "sleep" mode. The recurrent training user application 64 remains in "sleep" mode until awakening as instructed by the user through input of the configuration parameters, thereby enabling the user to interact with other programs also being executed by the computer system 32. Upon determining that it is time to awaken from "sleep" mode at step 564, the recurrent training user application 64 performs a number of tasks necessary to awaken, including the display of the user interface 100 in an enlarged main process window 101 at step 552. After awakening, the recurrent training user application 64 is once again ready to perform the same three major functions described above.

FIG. 13 displays a flowchart representation of the steps taken by the main process 550 of the recurrent training application 64. After starting at step 552, various default settings are established in RAM 38 during initialization at step 554. Next, at step 556, the computer system 32 prompts a user for a user identification (i.e., user name and password) by displaying a prompting message on monitor 46. Upon receiving a valid user identification via keyboard 48 at step 556, the computer system 32 accesses the group assignment table 94, the module assignment table 92, the group information table 90, the tab set information table 88, and the module information table 86, at step 558, in order to determine which training modules 72 of the plurality of training modules 72 are appropriate for and accessible to the user. The computer system 32 then reads Infobits from the training module data tables, including the Infobit base table 74, the Infobit detail table 76, and the Infobit attachments 78 for each appropriate training module 72, and reads tab caption text from the module information table 86 and sets up the tabs 114 of the user interface 100 with appropriate Infobits and caption text. Advancing to step 560, the computer system 32 loads a value for the test time waited variable and the test wait time variable, if available from a startup file, and stores the values at appropriate locations in RAM 38. Otherwise, the computer system 32 sets the value of the test time waited variable and the value of the test wait time variable to zero. The computer system 32, at step 562, configures the operating system 62 with an idle timer and starts operation of the idle timer to track the amount of time during which the recurrent training user application 64 has not received input from the user. The computer system 32 also configures and starts a test timer if, at step 560, a non-zero value for the test time waited variable has been loaded, thereby indicating that the user has previously delayed the taking of a test and must be tested once the value of the test time waited variable is greater than or equal to the value of the test wait time variable. Note that the timer(s) are configured so as to cause the operating system 62 to generate timer messages every 60 seconds and that the starting of each timer, as is true of all timers referred to herein, is staggered by one or two seconds from the starting of another timer so that timer messages are not generated by the timers at the same time.

Continuing at step 564, the computer system 32 sets the value of the idle time variable in RAM 38 equal to zero (i.e., to initialize the tracking of idle time) and moves to step 566 where the user interface 100 is displayed on monitor 46 in the enlarged main process window 101. In order that the main process 550 and, hence, the recurrent training application 64 receive input from the user which would, otherwise, be received by other applications, the computer system 32, at step 566, also redirects input from the keyboard 48 to the main process 550. Next, at step 568, the computer system 32 determines whether or not a timer message has been received from the operating system 62. If a timer message has been received, the computer system 32 executes the timer sub-process 640 at step 570 to process any received timer messages and upon return from the timer sub-process 640, proceeds to step 572 to check for user input. If no timer message has been received at step 568, the main process 550 continues at step 572 where it determines whether or not user input has been received via the keyboard 48 and/or the pointing device 54. If no user input has been received at step 572, the main process 550 loops back to step 568 where, once again, the computer system 32 checks for timer messages. If, at step 572, the computer system 32 determines that user input has been received, the computer system 32 sets the value of the idle time variable in RAM 38 equal to zero at step 574, thereby indicating that input has been received from the user.

Advancing to step 576, the computer system 32 determines whether or not the user has selected the "Schedule Learning Breaks" option (i.e., by choosing the "Options" keyword from the menu bar 108 of the user interface 100 to display the "Options" pull-down menu 140 and by then choosing the "Schedule Learning Breaks" selection 142 of the "Options" pull-down menu 140) in order to display the "Schedule Learning Breaks" menu 144. If the "Schedule Learning Breaks" selection 142 has been selected by the user, the computer system 32 executes the schedule learning breaks sub-process 720 at step 578 to display the "Schedule Learning Breaks" menu 144 and handle related user inputs as described below. Upon completing execution of sub-process 720, the computer system 32, once again, determines whether or not a timer message has been received at step 568. If the computer system 32 determines, at step 576, that the user has not selected the "Schedule Learning Breaks" selection 142 of the "Options" pull-down menu 140, the main process 550 advances to step 580 where the computer system 32 determines whether or not the user has selected the "sleep" button 124 from the button bar 110 of user interface 100 to place the recurrent training user application 64 into "sleep" mode and update any appropriate tabs 114 with new Infobits. If the computer system 32 determines that the user has selected the "sleep" button 124, the computer system 32 executes the sleep button sub-process 790 at step 582 before, as directed by the main process 550, again checking for the delivery of timer messages at step 568. If the computer system 32 determines that the "sleep" button 124 has not been selected by the user at step 580, the computer system 32 next determines, at step 584, whether or not the "bookmark" button 126 has been selected by the user to place the recurrent training user application 64 into "sleep" mode without updating the tabs 114 with new Infobits. If so, the computer system 32 executes the bookmark button sub-process 820 at step 586 and then, under control of the main process 550, loops back to step 568 where it determines whether or not a timer message has been received from the operating system 62. If, at step 584, the computer system 32 determines that the user has not selected the "bookmark" button 126, the main process 550 continues at step 588.

The computer system 32 determines, at step 588, whether or not the user has selected the "do not disturb" button 128 to place the recurrent training user application 64 into "sleep" mode and to prevent it from awakening before the period of time specified by the "do not disturb time". The computer system 32, upon determining that the user has selected the "do not disturb" button 128, executes the "do not disturb" button sub-process 850 at step 590. After completing execution of the "do not disturb" button sub-process 850, the main process 550 directs the computer system 32 to loop back to step 568 in order to determine whether or not a timer message has been received from the operating system 62. If the computer system 32 determines, at step 588, that the user has not selected the "do not disturb" button 128, the computer system 32 then determines, at step 592, whether or not the user has selected the "previous Infobit" button 130 from the button bar 110 of the user interface 100. If the computer system 32 determines that the "previous Infobit" button 130 has been selected by the user, the computer system 32 reads the previous Infobit from the training module 72 which is associated with foreground tab 114a at step 594 and proceeds, at step 596, to update the foreground tab 114a with the previous Infobit. The main process 550 then loops back to step 568 to check for timer messages received from the operating system 62. If, at step 592, the computer system 32 determines that the "previous Infobit" button 130 has not been selected by the user, the main process 550 advances to step 598 where the computer system 32 determines whether or not the user has selected the "next Infobit" button 132 from the button bar 110 of the user interface 100 to instruct the system 30 to display the next Infobit for the foreground tab 114a. If so, the computer system 32 executes the next button sub-process 880 at step 600 and returns, as directed by the main process 550, to once again determine whether or not, at step 568, any timer messages have been generated and received from the operating system 62. If, at step 598, the computer system 32 determines that the user has not selected the "next Infobit" button 132, the main process 550 proceeds to step 602.

At step 602, the computer system 32 checks to see if the main process window 101 has been minimized or if the main process window 101 lost the focus of the operating system 62. If the main process window 101 has been minimized or if the main process window 101 has lost the focus of the operating system 62, the computer system 32 terminates operation of the idle timer at step 604 and, at step 606, configures the operating system 62 with a focus timer and then starts the focus timer to track how long the recurrent training user application 64 has been without the focus. Once the focus timer has started, the main process 550 loops back to step 568 where the computer system 32 determines whether or not any timer messages have been received from the operating system 62. If, at step 602, the computer system 32 determines that the main process window 101 has not been minimized and that the main process window 101 has not lost the focus of the operating system 62, the computer system 32 determines, at step 608, whether or not the main process window 101 has been maximized by the user or whether the main process window 101 has regained the focus of the operating system 62. If the computer system 32 determines that either event has occurred, it configures the operating system 62 with an idle timer and starts the idle timer at step 610. Then, the computer system 32 sets the value of the idle time variable in RAM 38 equal to zero at step 612 and terminates operation of the focus timer at step 614 before returning, as directed by the main process 550, to check for receipt of timer messages from the operating system 62 at step 568. If, at step 608, the computer system 32 determines that the main process window 101 has not been maximized and that the main process 550 has not regained the focus of the operating system 62, the computer system 32 checks to see if the user has selected a background tab 114b from the user interface 100. If a background tab 114b has been selected, the computer system 32 reorders the tabs 114 to bring the selected background tab 114b to the foreground at step 618. Then, the computer system 32 sets the selected background tab 114b to be identified as the foreground tab 114a at step 620 before looping back to step 568, as instructed by the main process 550, to once again determine whether or not any timer messages have been received from the operating system 62. If, at step 616, the computer system 32 determines that a background tab 114b has not been selected by the user, the main process 550 presumes that another menu or button bar selection has been made by the user and, hence, the computer system 32 executes, at step 622, an appropriate sub-process (not described herein) to handle such a selection by the user. The main process 550 then loops back to step 568 where the computer system 32 checks for timer messages received from the operating system 62.

Figure 14A:
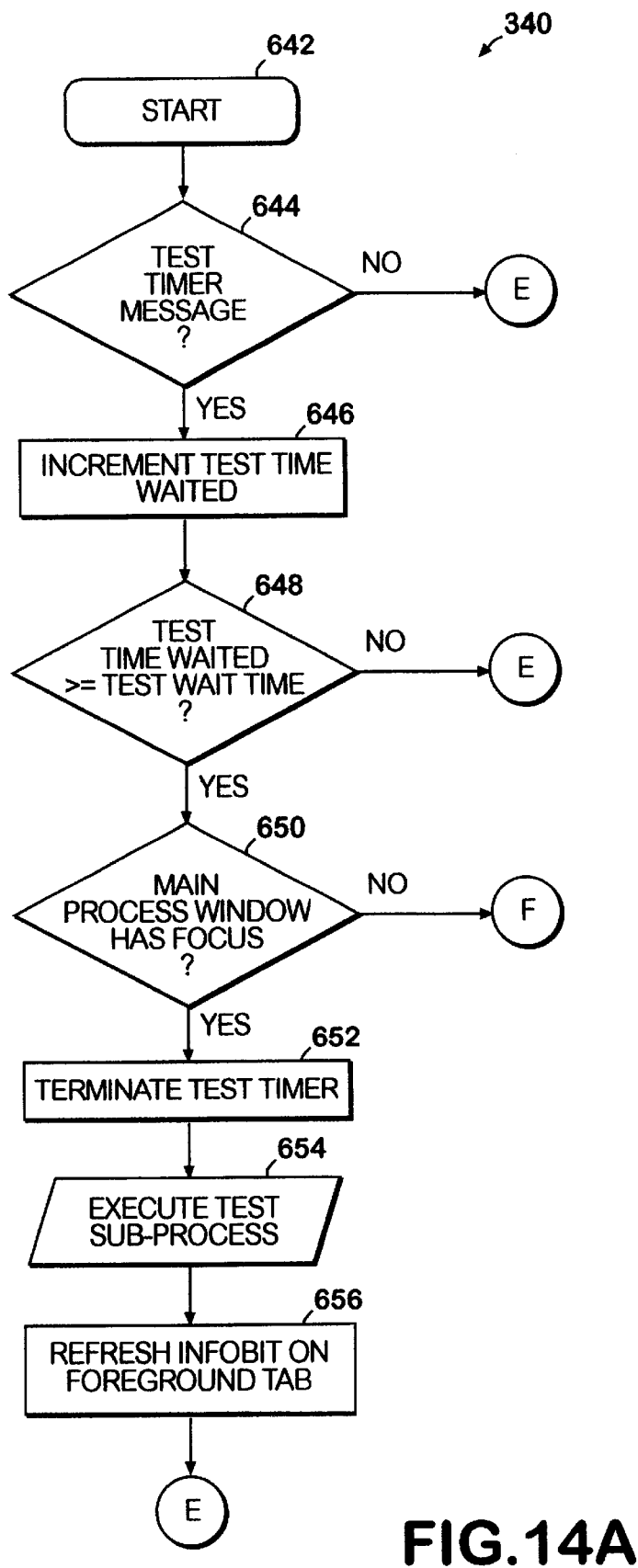
FIG. 14 is a flowchart representation of a timer sub-process of the recurrent training user application of FIG. 5.
Figure 14B:
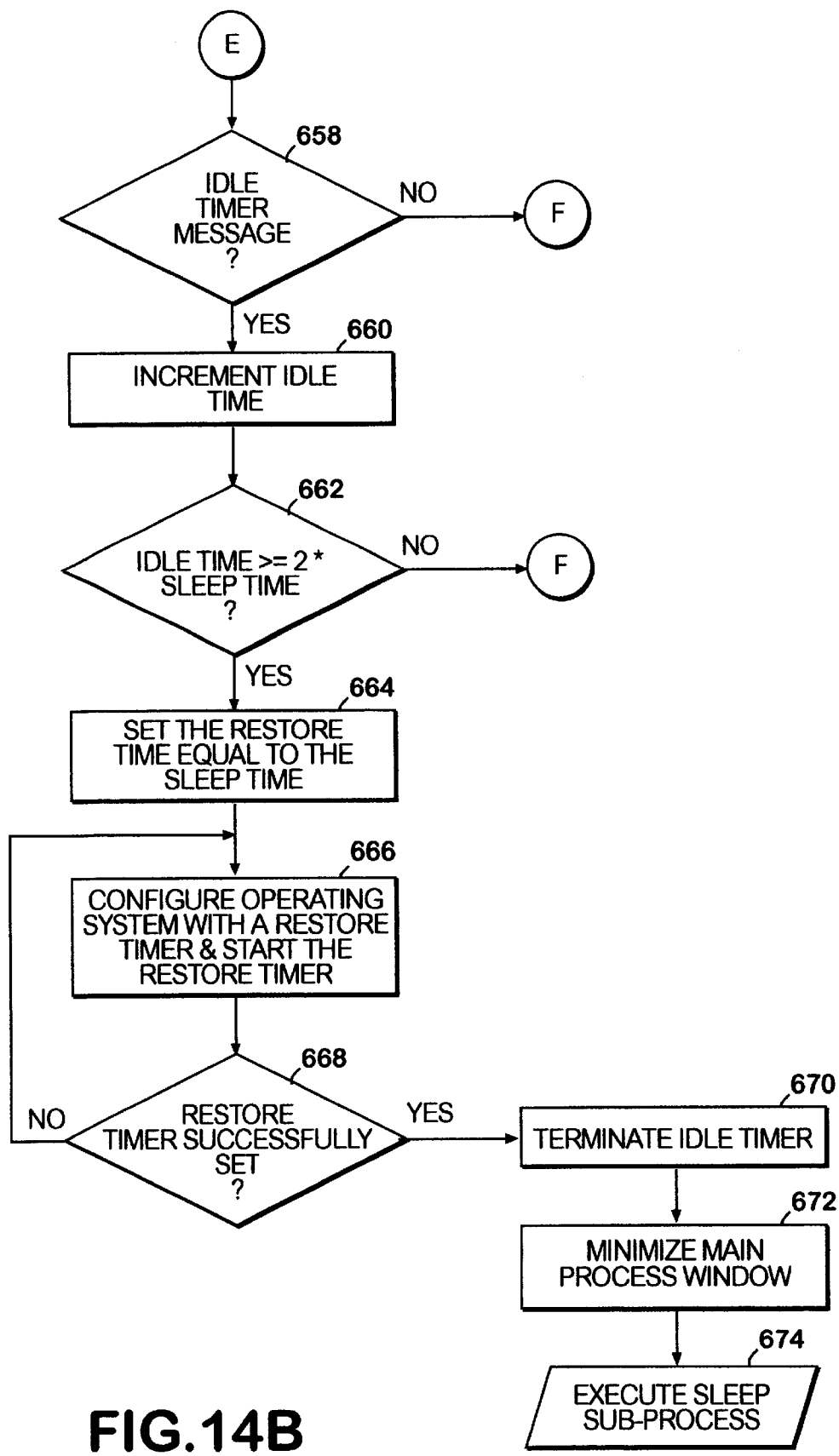
Figure 14C:
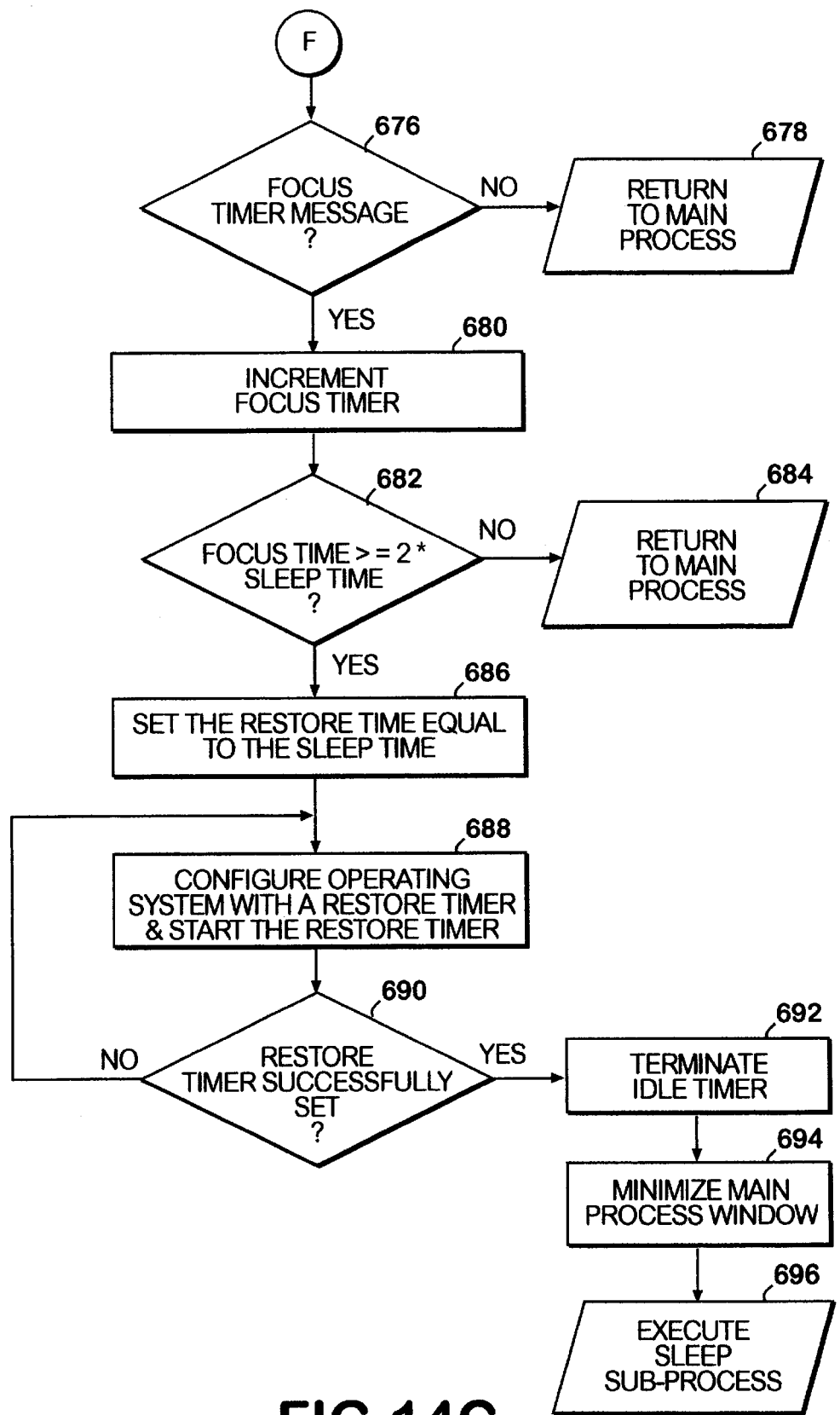

FIG. 14 represents a flowchart representation of the steps taken by the timer sub-process 640 of the recurrent training user application 64 when the delivery of a timer message from the operating system 62 has been detected by the main process 550 at step 568. The timer sub-process 640 ascertains what type of timer message (i.e., a test timer message, an idle timer message, or a focus timer message) has been received and performs appropriate actions based upon the type of timer message. After starting at step 642, the computer system 32, at step 644, determines whether or not a test timer message has been delivered to the recurrent training user application 64 by the operating system 62. If no test timer message has been received, the timer sub-process 640 instructs the computer system 32 to jump forward to step 658, described below, to see if the received timer message is an idle timer message. If the computer system 32 determines, at step 644, that the recurrent training user application 64 has received a test timer message, the computer system 32 increments the value of the test time waited variable in RAM 38 by one minute at step 646. Then, at step 648, the computer system 32 determines whether or not the value of the test time waited variable in RAM 38 is greater than or equal to the value of the test wait time variable also stored in RAM 38. If not, the timer sub-process 640 instructs the computer system 32 to advance to step 658 in order to check for receipt of an idle timer message from the operating system 62. If, at step 648, the value of the test time waited variable is greater than or equal to the value of the test wait time variable (i.e., indicating the expiration of the amount of time which the user previously requested that the system 30 delay before presenting test questions to the user), the computer system 32 determines, at step 650, whether or not the main process window 101 has the focus of the operating system 62. If it is determined that the main process window 101 does not have the focus, then no testing of the user can occur. Additionally, no idle timer messages are generated and delivered to main process 550 by the operating system 62. Therefore, the timer sub-process 640 advances to step 676 where it instructs the computer system 32 to check for receipt of a focus timer message. If, at step 650, the computer system 32 determines that the main process window 101 has the focus of the operating system 62, the computer system 32 terminates the test timer at step 652 and executes, at step 654, the test sub-process 930, described below, which presents test questions and answers to the user via monitor 46 and solicits responses to the questions, via keyboard 48 or pointing device 54, in order to evaluate the user's learning of the training information provided the user during his review of a plurality of Infobits. Upon completing execution of the test sub-process 930 at step 654, the computer system 32 refreshes the Infobit on foreground tab 114a.

Continuing at step 658, the computer system 32 determines whether or not an idle timer message has been received from the operating system 62. If no idle timer message has been received, the timer sub-process 640 continues at step 676 as described below. If, on the other hand, the computer system 32 detects the receipt of an idle timer message at step 658, the computer system 32 increments the value of the idle time variable in RAM 38 by one minute at step 660. Then, at step 662, the computer system 32 determines whether or not the value of the idle time variable in RAM 38 is greater than or equal to two times the value of the sleep time variable stored in RAM 38 and shown on the "Schedule Learning Breaks" menu 144. If the value of the idle time variable is not greater than or equal to two times the value of the sleep time variable, the timer sub-process 640 branches to step 676 described below. If, at step 662, the value of the idle time variable is greater than or equal to two times the value of the sleep time variable, the recurrent training user application 64 has been idle too long and places itself into "sleep" mode. Therefore, the computer system 32 sets the value of the restore time variable in RAM 38 equal to the value of the sleep time variable in RAM 38 at step 664 in preparation for placing the recurrent training user application 64 into "sleep" mode. Continuing at step 666, the computer system 32 configures the operating system 62 with a restore timer and starts the restore timer so that the operating system 62 will generate and deliver restore timer messages to the sleep sub-process 960 at one minute intervals. Next, at step 668, the computer system 32 determines whether or not the restore timer has been successfully set and, if not, loops back to step 666 of the timer sub-process 640 where it again attempts to configure the operating system 62 with a restore timer. If the restore timer has been successfully set at step 668, the computer system 32 terminates the idle timer at step 670 (i.e., since it is unnecessary to track idle time while in "sleep" mode), minimizes the main process window 101 at step 672, and places the recurrent training user application 64 into "sleep" mode while executing the sleep sub-process 960 at step 674.

The timer sub-process 640, at step 676, determines whether or not a focus timer message has been generated and received from the operating system 62. If no focus timer message has been received, control of the computer system 32 is returned to the main process 550 at step 678. If the receipt of a focus timer message is detected at step 676, the computer system 32 increments the focus timer by one minute at step 680 and then determines, at step 682, whether or not the value of the focus time variable in RAM 38 is greater than or equal to two times the value of the sleep time variable in RAM 38. If not, the timer sub-process 640 returns control of the computer system 32 back to the main process 550. If so, the recurrent training user application 64 prepares to enter "sleep" mode with the computer system 32, at step 686, setting the value of the restore time variable in RAM 38 equal to the value of the sleep time variable in RAM 38. Then, at step 688, the computer system 32 configures the operating system 62 with a restore timer and starts the restore timer to cause the operating system 62 to generate and deliver restore timer messages to the sleep sub-process 960 at one minute intervals. Next, at step 690, the computer system 32 determines whether or not the restore timer has been successfully set and, if not, attempts once again to configure the operating system 62 with a restore timer at step 688. If the restore timer has been successfully set at step 690, the computer system 32 terminates the idle timer at step 692, minimizes the main process window and user interface 100 at step 694, and executes the sleep sub-process 960 at step 696 to place the recurrent training user application 64 into "sleep" mode.

Figure 15A:
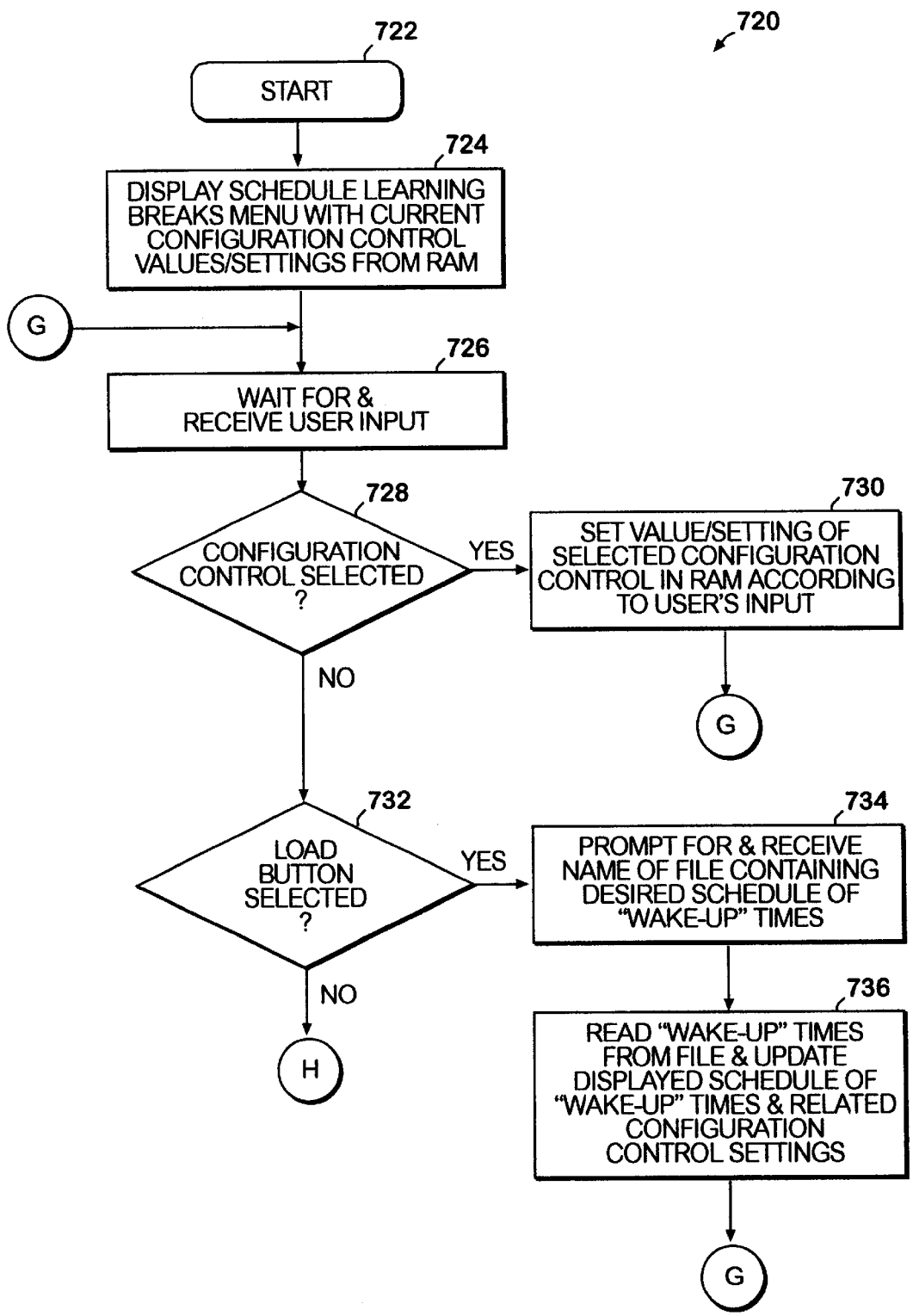
FIG. 15 is a flowchart representation of a schedule learning breaks sub-process of the recurrent training user application of FIG. 5.
Figure 15B:
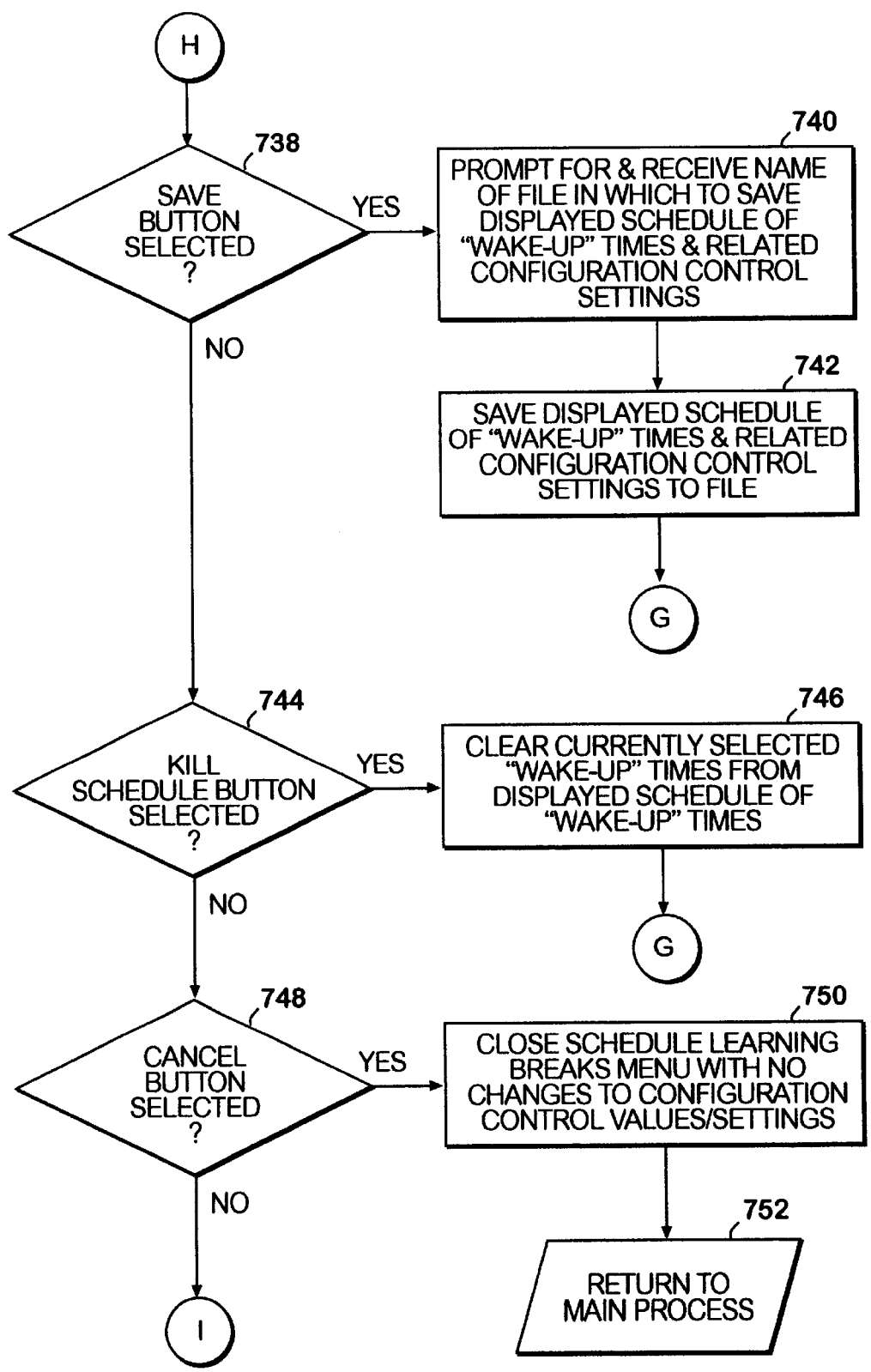
Figure 15C:
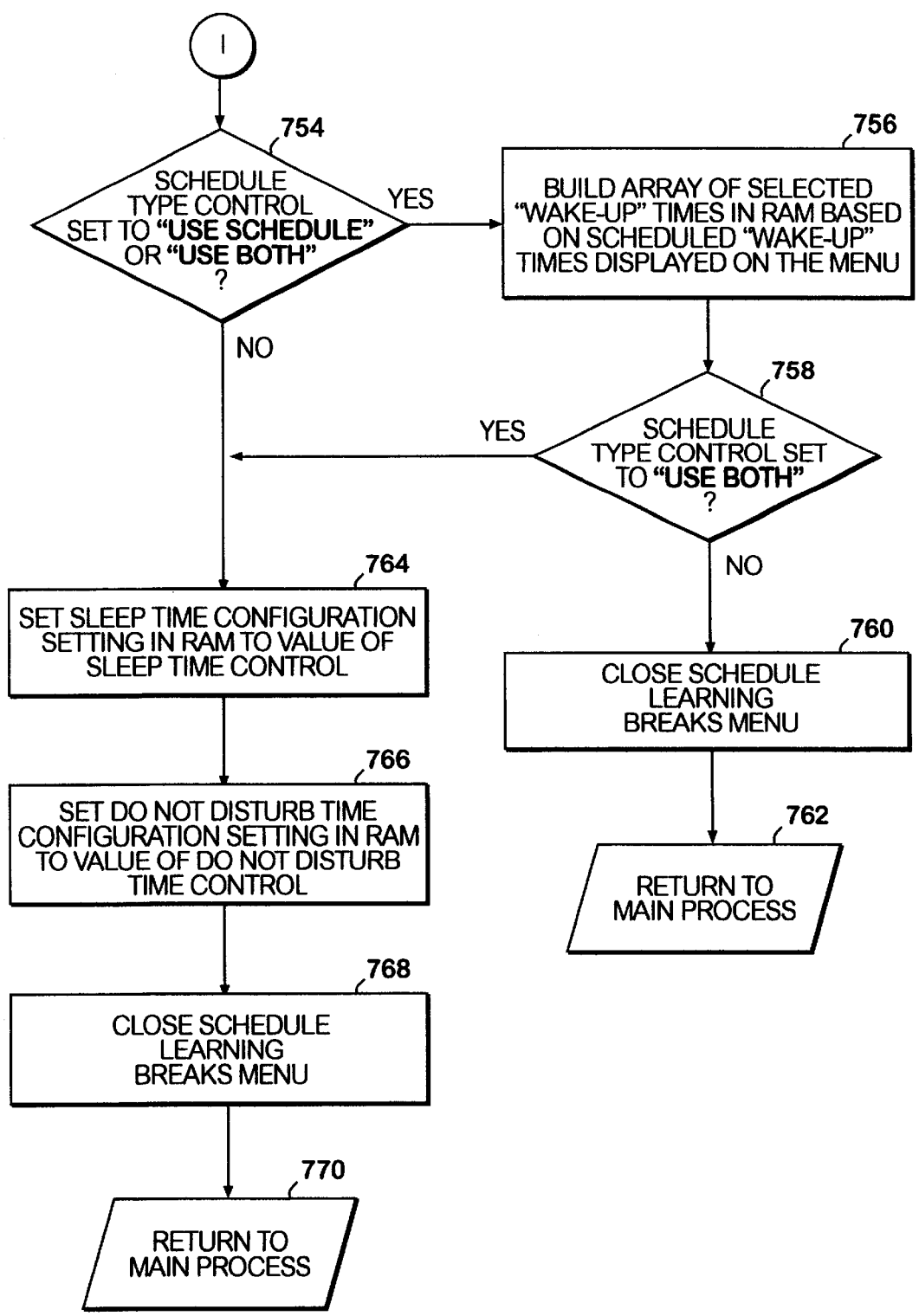

FIG. 15 depicts a flowchart representation of the steps taken by the schedule learning breaks sub-process 720 when executed in response to a user's choice of the "Schedule Learning Breaks" selection 142 from the "Options" pull-down menu 140 in order to cause display of the "Schedule Learning Breaks" menu 144. Upon starting at step 722, the computer system 32 displays the "Schedule Learning Breaks" menu 144 on monitor 46 with the current values/settings of the menu's various configuration controls. Then, at step 726, the computer system 32 waits for and receives user input via the keyboard 48 and/or the pointing device 54. At step 728, the computer system 32, having received user input, determines whether or not a configuration control, such as the schedule type control 146, the sleep time control 148, and the do not disturb time control 150, has been selected by the user. If so, the computer system 32 sets, at step 730, the value/setting in RAM 38 of the selected configuration control according to the user's input and then waits for further user input at step 726. If the computer system 32 determines, at step 728, that no configuration control has been selected by the user, the computer system 32 checks, at step 732, to see if the "Load" button 156 of the "Schedule Learning Breaks" menu 144 has been selected by the user. If so, at step 734, the computer system 32 prompts the user for and receives from the user a name of a file containing a schedule of "wake-up" times desired (and previously stored) by the user. Then, at step 736, the computer system 32 reads the schedule of "wake-up" times from the file and updates the schedule of "wake-up" times 154 of the "Schedule Learning Breaks" menu 144. The computer system 32 also updates, based on values/settings stored in the file with the schedule of "wake-up" times, the current settings of the schedule type control 146 and the schedule choice control 152. As directed by the schedule learning breaks sub-process 720, the computer system 32 then loops back to wait for and receive user input at step 726 of the sub-process 720. If, on the other hand, the computer system 32 determines, at step 732, that the load button 156 has not been selected by the user, the schedule learning breaks sub-process 720 advances to step 738.

The computer system 32, at step 738, determines whether or not the "Save" button 158 has been selected by the user. If so, the computer system 32 prompts the user, via monitor 46, for the name of a file in which to save the currently displayed schedule of "wake-up" times 154 and related configuration control settings. Upon receiving the name of a file from the user through keyboard 48, the computer system 32 saves the displayed schedule of "wake-up" times 154 and related configuration control settings to the file at step 742. Then, as directed by schedule learning breaks sub-process 720, the computer system 32 again waits for user input at step 726. If, at step 738, the computer system 32 determines that the "Save" button 158 has not been selected by the user, it determines, at step 744, whether or not the "Reset" button 160 has been selected by the user. If so, the computer system 32 clears, at step 746, the currently selected "wake-up" times from the displayed schedule of "wake-up" times 154 and proceeds to once again wait for user input according to the sub-process 720 at step 726. If the computer system 32 determines, at step 744, that the "Reset" button 160 has not been selected by the user, the computer system 32 checks, at step 748, to see if the "Cancel" button 162 has been selected by the user. If so, the computer system 32 closes the "Schedule Learning Breaks" menu 144 with no changes being made to the values/settings of the configuration controls stored in RAM 38 or on hard disk 42. At step 752, the schedule learning breaks sub-process 720 returns control of the computer system 32 to the main process 550. If, at step 748, the computer system 32 determines that the "Cancel" button 162 has not been selected by the user, the sub-process 720 advances to step 754.

The computer system 32, as directed at step 754 of the schedule learning breaks sub-process 720, presumes that the "Use" button 164 has been selected by the user and determines whether the setting of the schedule type control 146 is set to "Use Schedule" or to "Use Both" (i.e., indicating whether the sleep sub-process 960, described below, should use the value of the sleep time control 148 or "wake-up" times from the schedule of "wake-up" times 154 in order to determine when to awaken the recurrent training user application 64 from "sleep" mode). If the computer system 32 determines that the schedule type control 146 is set to "Use Schedule" or to "Use Both", it builds the array of selected "wake-up" times 176 in RAM 38 which are based upon the selected "wake-up" times displayed in the schedule of "wake-up" times 154 on the "Schedule Learning Breaks" menu 144. Next, at step 758, the computer system 32 determines whether or not the schedule type control 46 is set to "Use Both". If not, the computer system 32 closes the "Schedule Learning Breaks" menu 144 at step 760 and the schedule learning breaks sub-process 720 returns control of the computer system 32 to main process 550 at step 762. If, at step 754, the computer system 32 determines that the schedule type control 146 is set to "Use Schedule" or to "Use Both" or if, at step 758, the computer system 32 determines that the schedule type control 146 is set to "Use Both", the schedule learning breaks sub-process 720 causes the computer system 32 to set, at step 764, the value of the sleep time variable in RAM 38 equal to the value held by the sleep time control 148. At step 766, the computer system 32 sets the value of the do not disturb time variable in RAM 38 equal to the value held by the do not disturb time control 150. Continuing at step 768, the computer system 32 closes the "Schedule Learning Breaks" menu 144 and, at step 770, the schedule learning breaks sub-process 720 returns control of the computer system 32 to the main process 550.

Figures 16, 17:
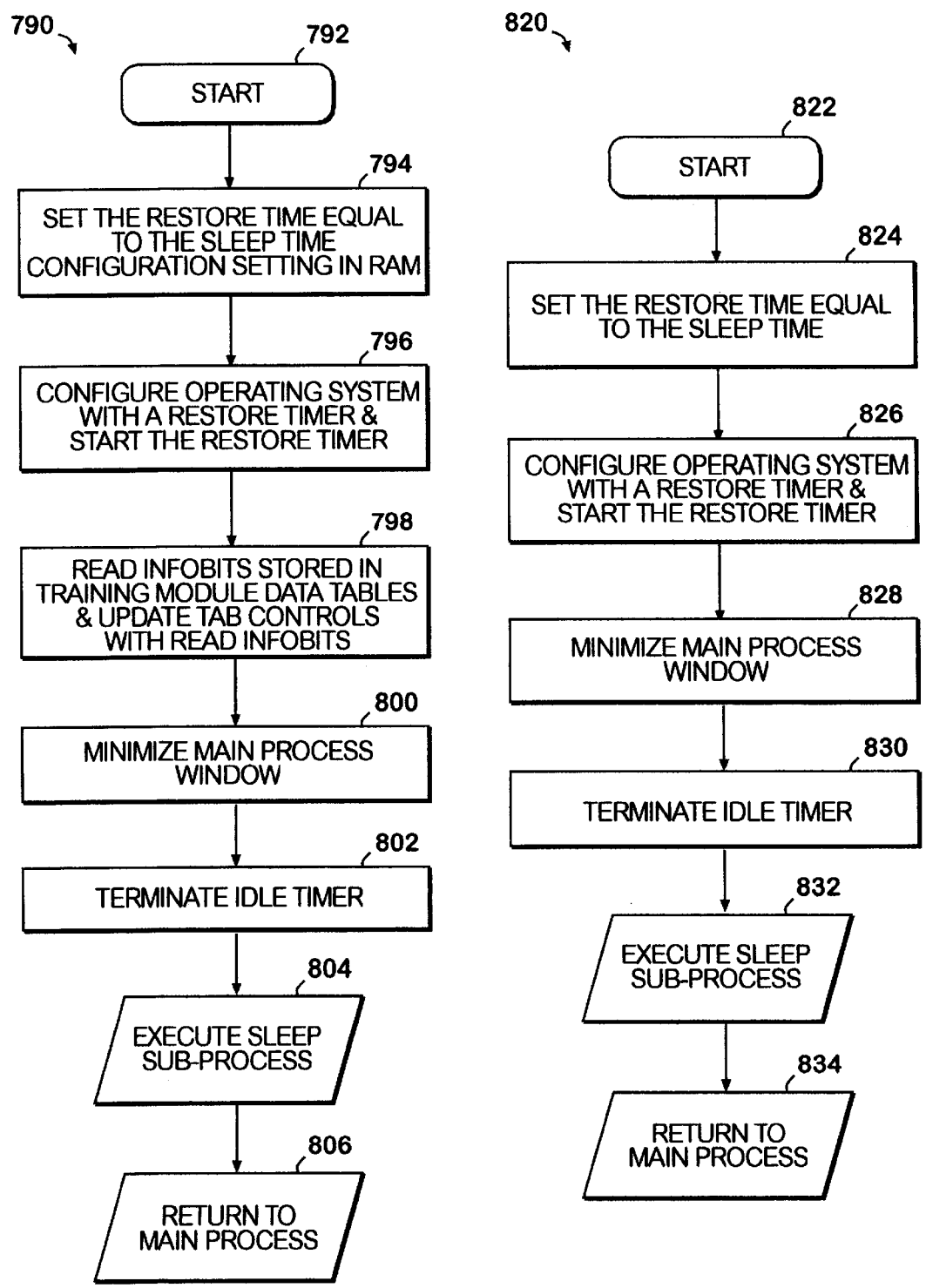
FIG. 16 is a flowchart representation of a sleep button sub-process of the recurrent training user application of FIG. 5.
FIG. 17 is a flowchart representation of a bookmark button sub-process of the recurrent training user application of FIG. 5.

FIG. 16 displays a flowchart representation of the steps taken by the recurrent training system 30 when executing the sleep button sub-process 790 of the recurrent training user application 64. Note that the sleep button sub-process 790 is executed, at step 582 of main process 550, in response to detection of a selection of the "sleep" button 124 of the user interface 100 by a user who wishes to place the recurrent training user application 64 into "sleep" mode. After starting at step 792, the sleep button sub-process 790 advances to step 794 where the computer system 32 sets the value of the restore time variable in RAM 38 equal to the value of the sleep time variable in RAM 38 in preparation for the recurrent training user application 64 being placed into "sleep" mode. Next, at step 796, the computer system 32 configures the operating system 62 with a restore timer and starts the restore timer to enable generation and delivery of restore timer messages at one minute intervals to the sleep process 960 described below. Advancing to step 798, the computer system 32 reads Infobits from the data tables of the training module 72 which are associated with tabs 114. Then, presuming that the user has already reviewed any currently displayed Infobits, the computer system 32 updates the tabs 114 with the Infobits read from the data tables of training module 72, thereby enabling the tabs 114 to display new Infobits when the recurrent training user application 64 awakens from "sleep" mode. Continuing at step 800, the computer system 32 minimizes the main process window 101 and its user interface 100 and proceeds, at step 802, to terminate the idle timer since it is not necessary to track idle time while the recurrent training user application 64 is in "sleep" mode. At step 804, the computer system 32 executes the sleep sub-process 960 during which the recurrent training user application 64 is in "sleep" mode. Then, at step 806, the sleep button sub-process 790 returns control of the computer system 32 to the main process 550 at step 568.

FIG. 17 illustrates a flowchart representation of the steps taken by the recurrent training system 30 when executing the bookmark button sub-process 820 of the recurrent training user application 64. After starting at step 822, the computer system 32 sets, at step 824, the value of the restore time variable in RAM equal to the value of the sleep time variable in RAM 38, thereby preparing the recurrent training user application 64 to execute in "sleep" mode for a period of time as shown by the sleep time control 148 of the "Schedule Learning Breaks" menu 144 and as stored in the sleep time variable in RAM 38. At step 826, the computer system 32 configures the operating system 62 with a restore timer and starts the restore time to generate and deliver restore timer messages to the sleep sub-process 960, described below, at one minute intervals. Upon starting the restore timer, the computer system 32 minimizes, at step 828, the main process window 101 and its user interface 100. Next, at step 830, the computer system 32 terminates the idle timer since it is unnecessary to track idle time of the recurrent training user application 64 while it is in "sleep" mode. Advancing to step 832, the bookmark button sub-process 820 causes the computer system 32 to execute the sleep sub-process 960 and, at step 834, returns control of the computer system 32 to the main process 550 of the recurrent training user application 64. Note that the bookmark button sub-process 820, unlike the sleep button sub-process 790, does not presume that the user has reviewed the Infobits currently displayed on tabs 114. Therefore, the bookmark button sub-process 820 does not update the tabs 114 with new Infobits.

Figure 18:
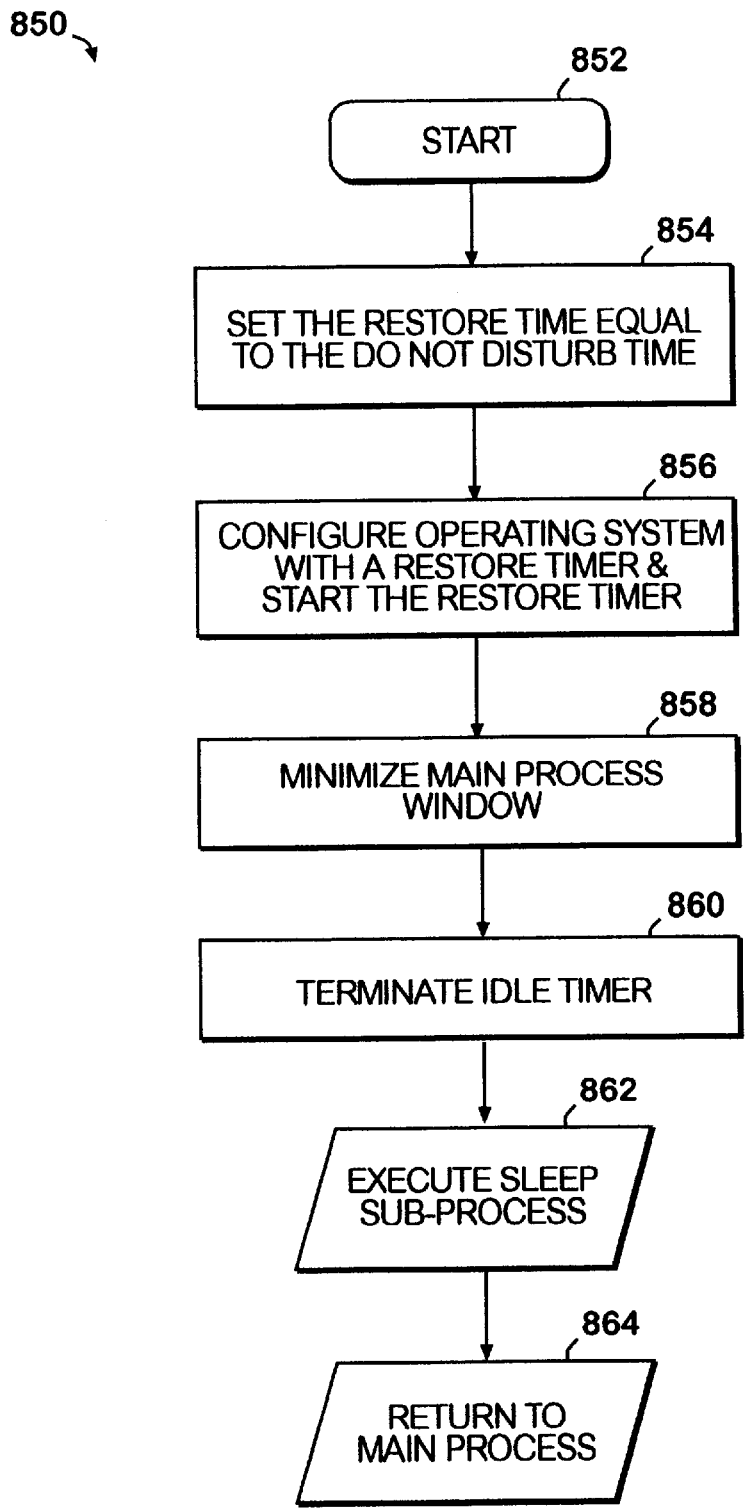
FIG. 18 is a flowchart representation of a do not disturb button sub-process of the recurrent training user application of FIG. 5.

FIG. 18 depicts a flowchart representation of the steps taken by the recurrent training system 30 when executing the do not disturb button sub-process 850 of the recurrent training user application 64. Note that the do not disturb button sub-process 850 executes in response to selection of the "do not disturb" button 128 from button bar 10 of the user interface 100 by a user wishing to avoid training for the period of time shown by the do not disturb time control 150 of the "Schedule Learning Breaks" menu 144. After starting at step 852, the computer system 32, at step 854, sets the value of the restore time variable in RAM 38 equal to the value of the do not disturb time variable in RAM 38 (i.e., shown by the do not disturb time control 150). Upon setting the value of the restore time variable, the computer system 32, at step 856, configures the operating system 62 with a restore timer and starts the restore timer causing the operating system 62 to generate and deliver restore timer messages at one minute intervals to the sleep sub-process 960 described below. Next, at step 858, the computer system 32 minimizes the main process window 101 and its user interface 100. The computer system 32 then, at step 860, terminates the idle timer and, at step 862, executes the sleep sub-process 960 during which the recurrent training user application 64 is in "sleep" mode. Upon completion of the execution of the sleep sub-process 960 by the computer system 32, the do not disturb button sub-process 850 returns control of the computer system 32 to the main process 550 at step 568 where the main process 550 checks for receipt of timer messages.

Figure 19A:
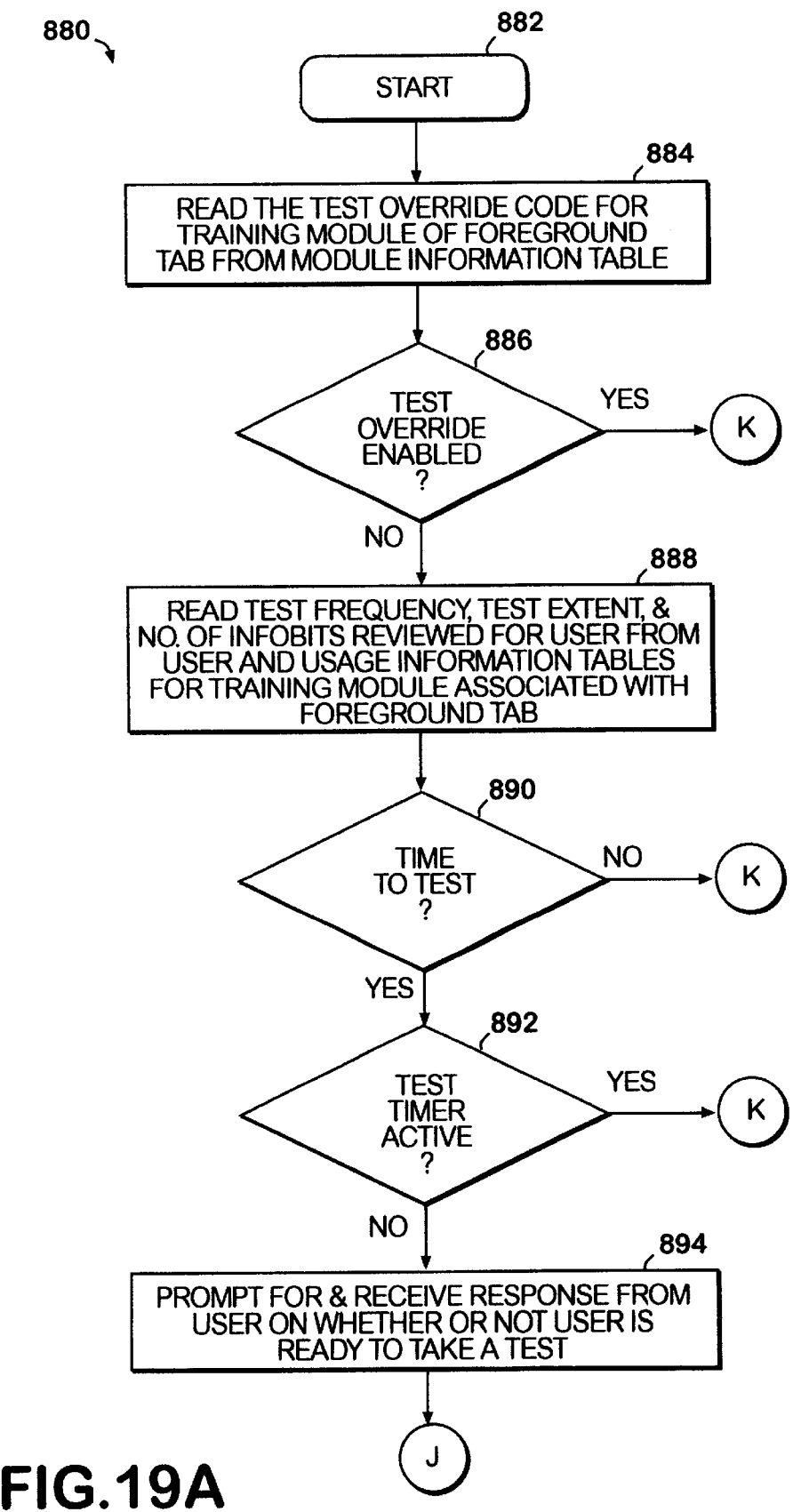
FIG. 19 is a flowchart representation of a next button sub-process of the recurrent training user application of FIG. 5.
Figure 19B:
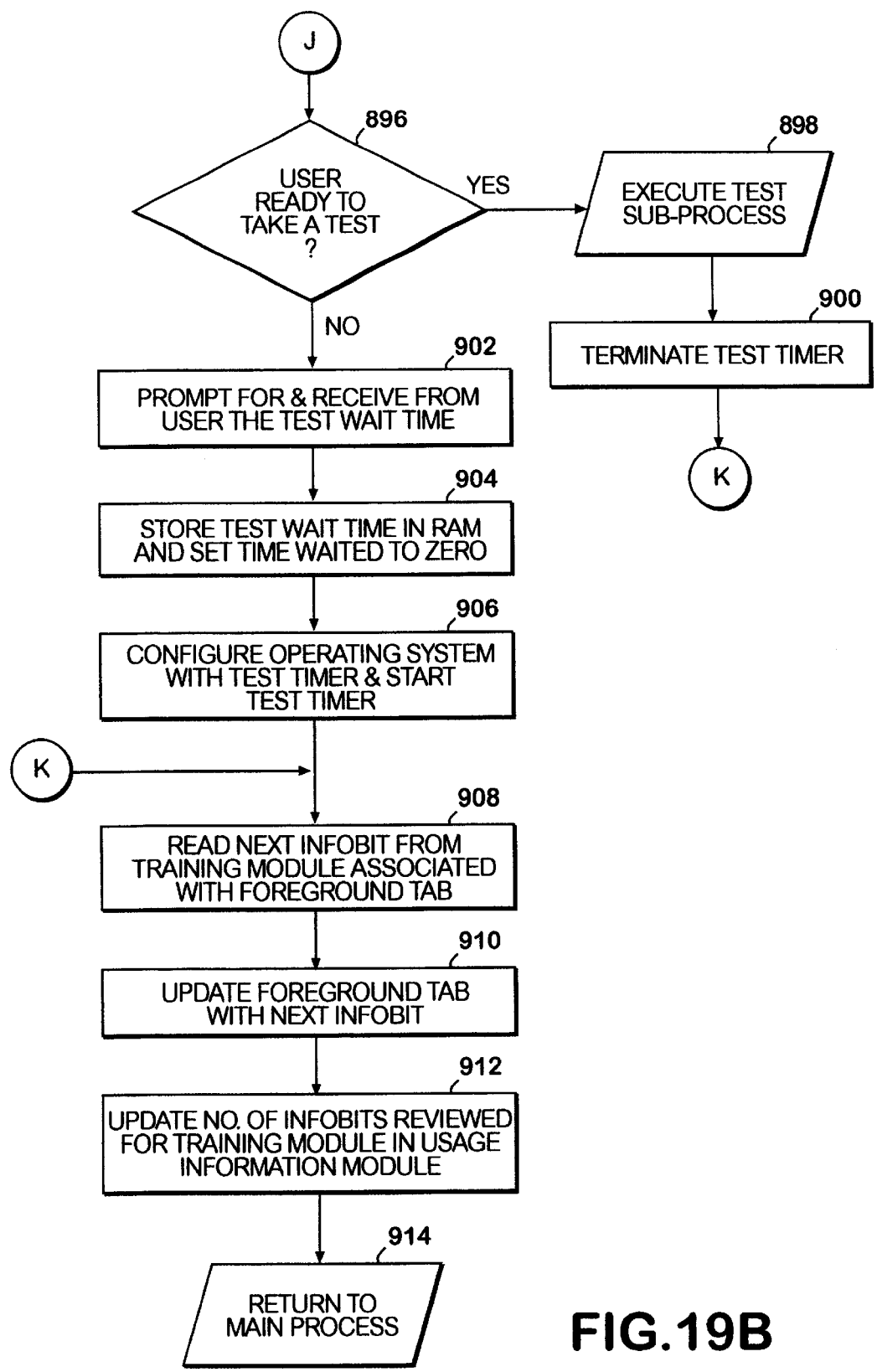

FIG. 19 displays a flowchart representation of the steps taken by the recurrent training system 30 when executing the next button sub-process 880 of the recurrent training user application 64. The next button sub-process 880 is executed by the recurrent training system 30 when the computer system 32, at step 598 of the main process 550, determines that the user has selected the "next Infobit" button 132 of user interface 100. After starting at step 882, the computer system 32 reads, at step 884, the test override code from the module information table 86 for the training module 72 associated with foreground tab 114a. Then, based upon the test override code read at step 884, the computer system 32 determines whether or not test override is enabled for the training module 72 associated with foreground tab 114*a*. If test override is enabled, no testing is to be performed with respect to the training module 72 associated with foreground 114*a* and the computer system 32 advances to step 908 below, bypassing potential testing of the user. If the computer system 32 determines, at step 886, that test override is not enabled for the training module 72 of foreground tab 114*a*, the computer system 32 reads the frequency and the test extent set for the user in the user information table 82 and reads the number of Infobits that the user has reviewed from the usage information table 84 for the training module 72 associated with the foreground tab 114*a*. Next, at step 890, the computer system 32 determines whether or not testing is appropriate at the present time based upon the test frequency and the number of Infobits reviewed data read during step 888. If the computer system 32 determines that testing is not appropriate at the present time, the computer system 32 proceeds to read the next Infobit for foreground tab 114*a* as indicated at step 908. If, on the other hand, the computer system 32 determines that testing is appropriate at the present time, the computer system 32 checks, at step 892, to see if the test timer is active. If so, the user has previously instructed the recurrent training user application 64 to delay for a period of test wait time, specified by the user, before any testing is conducted. If not, the computer system 32, at step 894, prompts the user on monitor 46 to determine whether or not the user is ready to take a test and receives a response from the user via keyboard 48.

Continuing, at step 896, the computer system 32 evaluates the user's response and determines whether or not the user is ready to take a test. If so, the computer system 32 executes the test sub-process 930, described below, at step 898 and then terminates the test timer at step 900 (i.e., since testing has been completed for the present time) before branching to read the next Infobit for foreground tab 114*a* at step 908. If the computer system 32 determines that the user is not ready to take a test at step 896, the computer system 32 prompts the user via monitor 46, for a test wait time at step 902 and receives a test wait time from the user via keyboard 48. Upon receiving a test wait time, the computer system 32, at step 904, stores the value of the test wait time in RAM 38 and sets the value of the time waited variable in RAM equal to zero. Next, at step 906, the computer system 32 configures the operating system 62 with a test timer and starts the test timer to cause the operating system 62 to generate and deliver test timer messages at one minute intervals to the main process 550, thereby enabling the system 30 to determine when the test wait time has expired. Continuing at step 908, the computer system 32 reads the next Infobit from the training module 72 associated with the foreground tab 114*a* and then, at step 910, updates the foreground tab 114*a* with the Infobit read at step 908. The computer system 32 then updates the number of Infobits reviewed in the usage information table 84 for the training module 72 associated with the foreground tab 114*a* at step 912 before returning, at step 914, to execute the steps of the main process 550.

Figure 20:
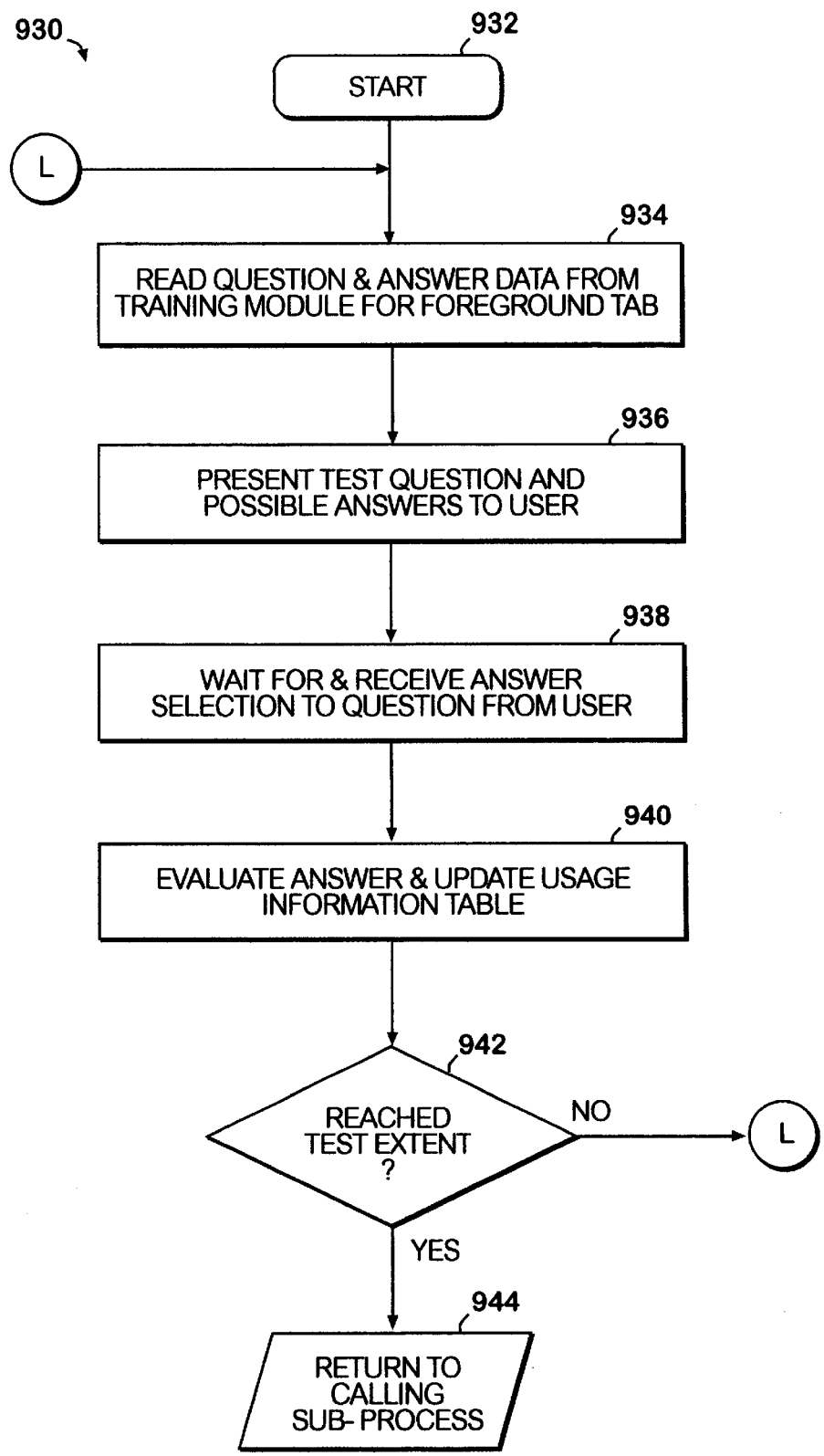
FIG. 20 is a flowchart representation of a test sub-process of the recurrent training user application of FIG. 5.
Figure 21A:
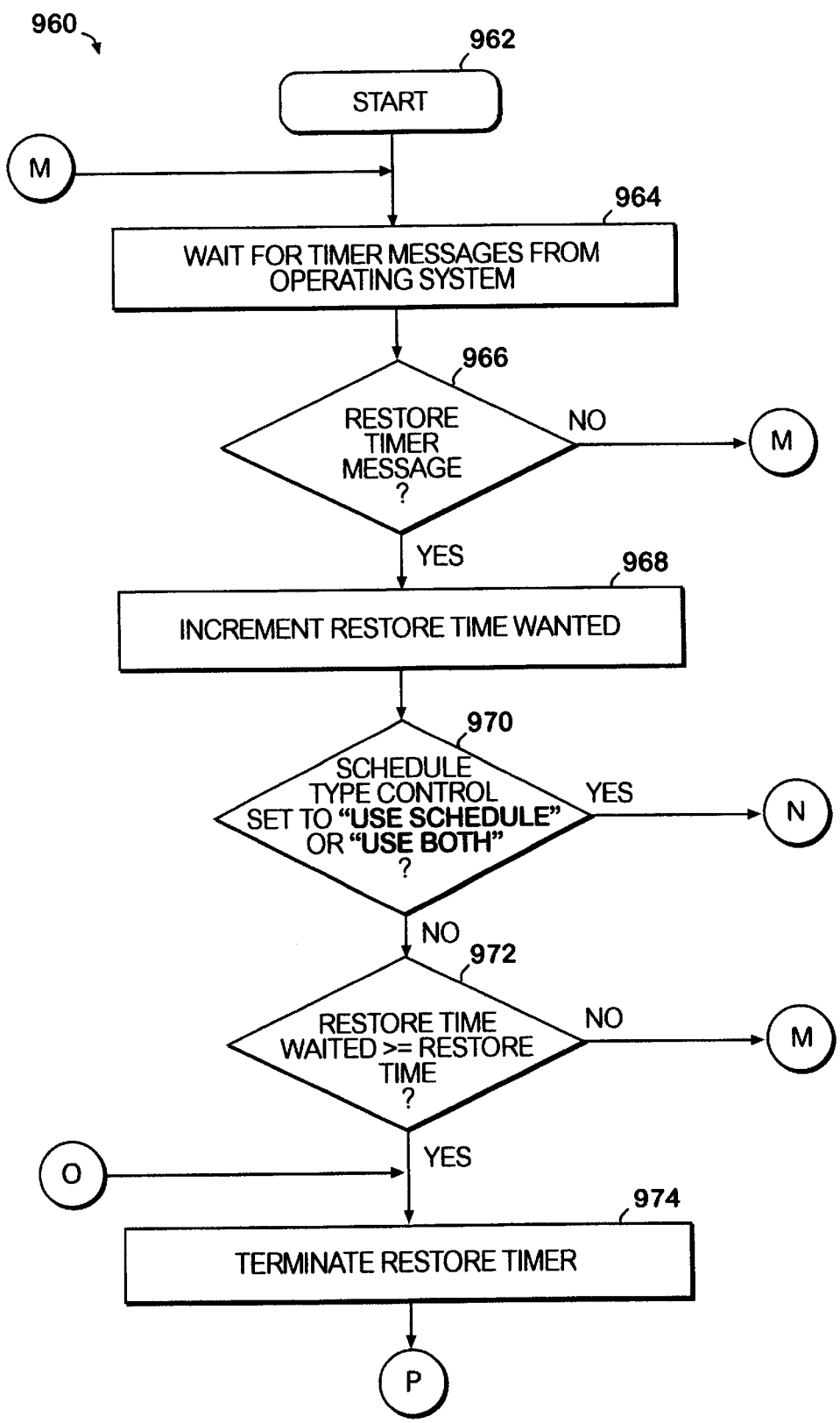
FIG. 21 is a flowchart representation of a sleep sub-process of the recurrent training user application of FIG. 5.
Figure 21B:
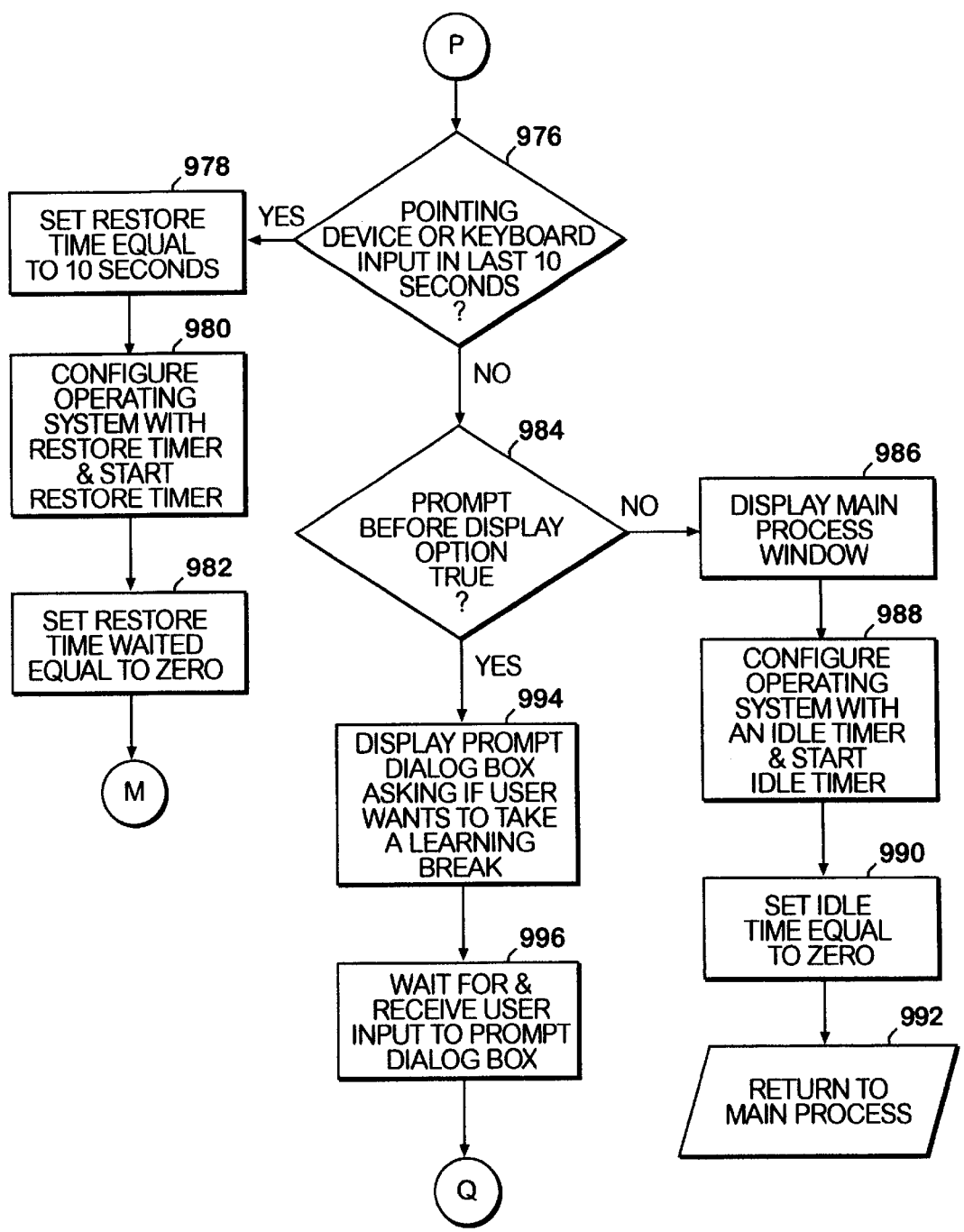
Figure 21C:
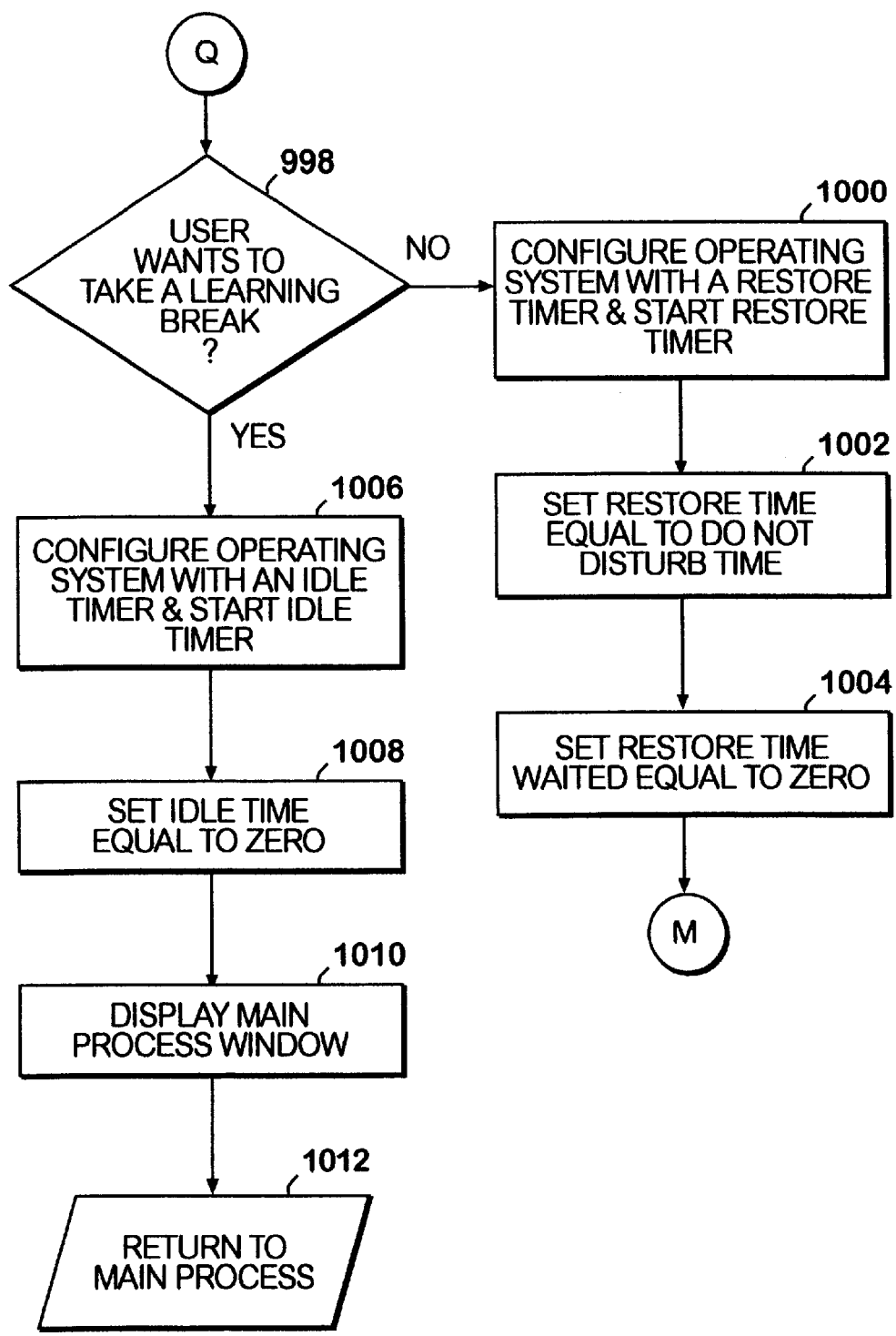
Figure 21D:
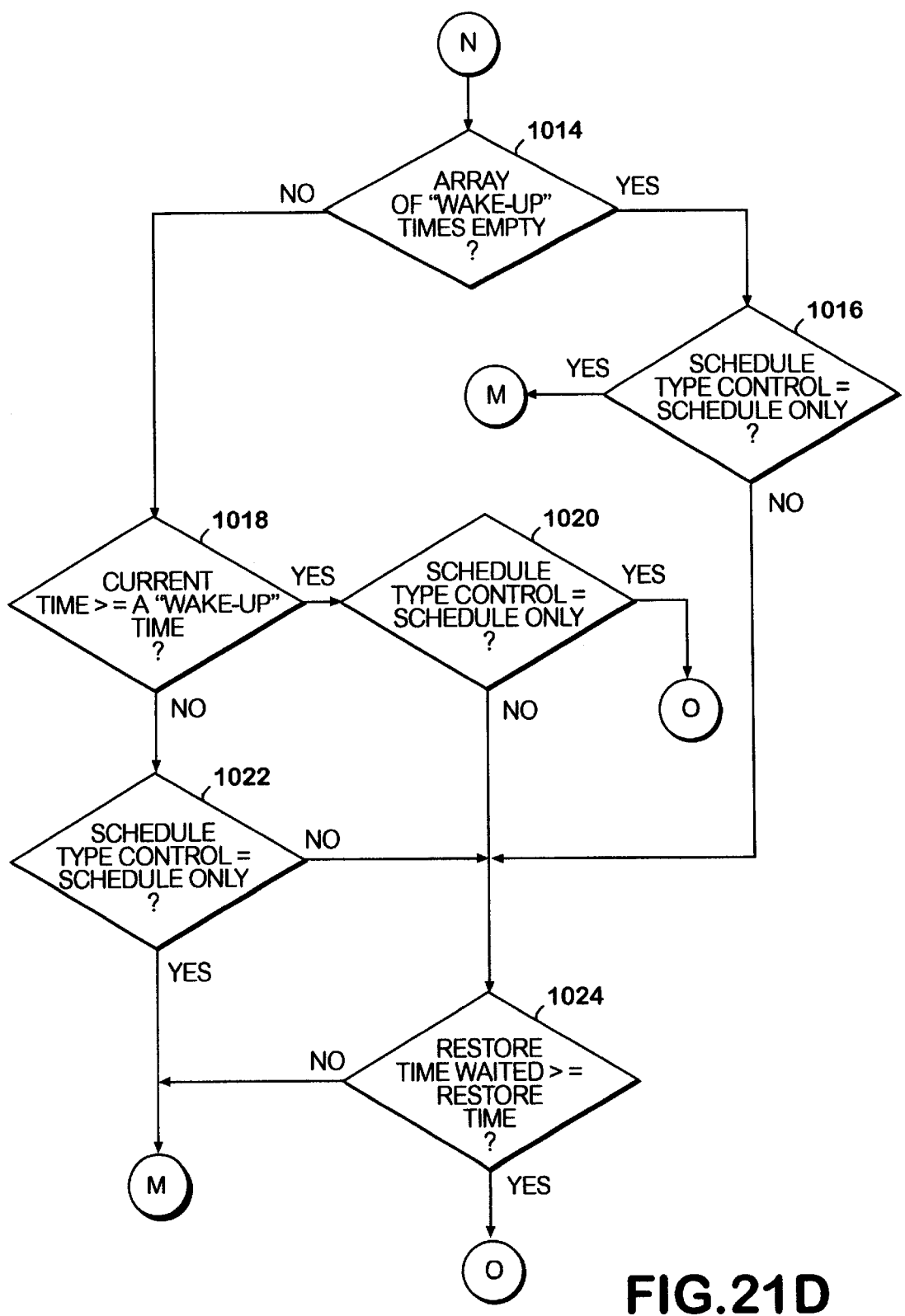

FIG. 20 depicts a flowchart representation of the steps taken by the recurrent training system 30 when executing the test sub-process 930 of the recurrent training user application 64. After starting at step 932, the computer system 32, at step 934, reads question, answer, and related data associated with testing from the Infobit base table 74 and the Infobit detail table 76 for the training module 72 associated with the foreground tab 114*a*. At step 936, the computer system 32 presents a test question and possible answers to the users via the monitor 46 and then, at step 938, waits for and receives an answer selection to the question from the user via the keyboard 48. Upon receiving an answer selection to the question from the user, the computer system 32, at step 940, evaluates the answer and updates the usage information table 84 in order to allow the recurrent training user application 64 to track the user's training progress. Continuing at step 942, the computer system 32 determines whether or not it has reached the test extent for the user as specified in the user information table 82. If not, the test sub-process 930 loops to step 934 where the computer system 32 reads another question and associated answer data from the training module 72 associated with the foreground tab 114*a*. If the computer system 32 determines, at step 942, that the user's test extent has been reached, control of the computer system 32 is returned to the calling sub-process which initiated the test sub-process 930.

FIG. 21 illustrates a flowchart representation of the steps taken by the recurrent training system 30 when executing the sleep sub-process 960 of the recurrent training user application 64. The sleep sub-process 960 executes while the recurrent training user application 64 is in "sleep" mode and determines when to awaken the recurrent training user application 64. After starting at step 962, the computer system 32, at step 964, waits for timer messages which are generated and delivered by the operating system 62. Upon receiving a timer message from the operating system 62, the computer system 32 determines whether or not a restore timer message has been received at step 966. If not, the sleep sub-process 960 causes the computer system 32 to loop back and wait for timer messages from the operating system 62. If the computer system 32 determines that it has received a restore timer message at step 966, the computer system 32 increments the value of the restore time waited variable in RAM 38 as directed by the sleep sub-process 960 at step 968. Then, at step 970, the computer system 32 checks to see if the schedule type control 146 is set to "Use Schedule" or to "Use Both". If it is set to either, the computer system 32 must determine whether or not to awaken the recurrent training user application 64 based upon a scheduled "wake-up" time stored in the array of "wake-up" times 176 in RAM 38 and branches to step 1014 of the sleep sub-process 960 described below. If the computer system 32, at step 970, determines that the schedule type control 146 is not set to "Use Schedule" or to "Use Both" (i.e., indicating that the schedule type control 146 is set to "Use Sleep Timer"), it compares, at step 972, the value of the restore time waited variable in RAM 38 to see if it is greater than the value of the restore time variable stored in RAM 38 and, hence, whether it is time to awaken the recurrent training user application 64. If not, the sleep sub-process 960 directs the computer system 32 to loop back to step 964 where the computer system 32 waits for timer messages from the operating system 62. If the value of the restore time waited variable in RAM 38 is greater than or equal to the value of the restore time variable in RAM 38, it is time to awaken the recurrent training user application 64 and the computer system 32, at step 974, terminates the restore timer.

Advancing to step 976, the computer system 32 determines whether or not the user has made an input using either the pointing device 54 or the keyboard 48 within the last ten seconds. If so, the sleep sub-process 960 delays awakening the recurrent training user application 64 for ten seconds to allow the user to complete input. To do so, the computer system 32 sets the value of the restore time variable in RAM 38 equal to ten seconds at step 678. Then, at step 980, the computer system 32 configures the operating system 62 with a restore time and starts the restore timer causing generation and delivery of restore timer messages at ten (10) second intervals to the sleep sub-process 960. After starting the restore timer, the computer system 32 sets the value of the restore time waited variable in RAM 38 equal to zero at step 982 (i.e., to indicate that no time has been waited) and, as directed by the sleep sub-process 960, loops back to wait for timer messages from the operating system 62 at step 964. If, at step 976, the computer system 32 determines that no input has been received from the user in the last 10 seconds, the computer system 32 checks, at step 984, to determine whether or not it should prompt the user to ascertain whether the user desires to take a learning break at the current time. If not, the computer system 32 displays the main process window 101 and user interface 100 at step 986. Then, at step 988, the computer system 32 configures the operating system 62 with an idle timer (i.e., to enable tracking of idle time) and starts the idle timer to cause the generation delivery of idle timer messages from the operating system 62 to the main process 550. Next, at step 990, the computer system 32 sets the value of the idle time variable in RAM 38 equal to zero and, at step 992, the sleep sub-process 960 returns control of the computer system 32 to the main process 550 since the recurrent training user application 64 has now been awakened from "sleep" mode. If, on the other hand, at step 984, the computer system 32 determines that it should prompt the user to ascertain whether or not the user wishes to take a learning break, the computer system displays dialog box 166 at step 994 and waits for and receives user input to the dialog box 166 at step 996.

Advancing to step 998 of the sleep sub-process 960, the computer system 32 considers the input received from the user via dialog box 166 at step 996. If the user's response indicates that the user does not want to take a learning break at the present time and does not want to be disturbed (i.e., the user selected the "do not disturb" option from the dialog box 166), the computer system 32, at step 1000, configures the operating system 62 with a restore timer and starts the restore timer to generate and deliver restore timer messages to the sleep sub-process 960 at one minute intervals. Upon starting the restore timer, the computer system 32 sets the value of the restore time variable in RAM 38 equal to the value of the do not disturb time variable in RAM 38 at step 1002. Then, at step 1004, the computer system 32 sets the value of the restore time waited variable in RAM 38 equal to zero (i.e., to indicate that no time has been waited) and loops back, as directed by the sleep sub-process 960, to wait, at step 964, for timer messages delivered by the operating system 62. If the computer system 32 at step 998, determines that the user wants to take a learning break at the present time (i.e., the user selected the "Yes" option from the dialog box 166), the computer system 32 advances to step 1006 of the sleep sub-process 960 where it configures the operating system 62 with an idle timer and starts the idle timer to generate and deliver idle timer messages to the sleep sub-process 960 at one minute intervals in preparation for awakening the recurrent training user application 64 from "sleep" mode. Next, at step 1008, the computer system 32 sets the value of the idle time variable in RAM 38 equal to zero and, at step 1010, displays the main process window 101 and user interface 100. Having awakened the recurrent training user application 64 from "sleep" mode, the sleep sub-process 960 returns control over the computer system 32 to the main process 550.

As noted above, if the computer system 32 determines, at step 970, that the schedule type control 146 is set to "Use Schedule" or to "Use Both", the sleep sub-process 960 advances to step 1014 where the computer system 32 determines whether or not the array of "wake-up" times 176 in RAM 38 is empty. If so, no "wake-up" times have been scheduled by the user and the computer system 32 then determines, at step 1016, whether or not the schedule type control 146 is set to only "Use Schedule". If so, the computer system 32, as directed by the sleep sub-process 960, loops back to step 964 to wait for timer messages from the operating system 62. If, at step 1016, the computer system 32 determines that the schedule type control 146 is not set only to "Use Schedule", the computer system 32 advances to execute step 1024 of the sleep sub-process 960 as described below. Should the computer system 32 determine, at step 1014, that the array of "wake-up" times 176 in RAM 38 is not empty (i.e., indicating that the user has scheduled at least one "wake-up" time), the computer system 32, at step 1018, determines whether or not the current time is greater than or equal to any "wake-up" times contained in the array of "wake-up" 176 times stored in RAM 38. If so, the computer system 32 checks to see if the schedule type control 146 is set to only "Use Schedule" at step 1020 of the sleep sub-process 960. If so, the computer system 32, as instructed by the sleep sub-process 960, loops back to step 974 where it terminates the restore timer and proceeds to awaken the recurrent training user application 64. If not, the computer system 32 proceeds to execute step 1024 of the sleep sub-process 960 as described below. Should the computer system 32, at step 1018, determine that the current time is not greater than and not equal to any "wake-up" time contained in the array of "wake-up" times 176 in RAM 38, the computer system 32 executes step 1022 of the sleep sub-process 960 where it determines whether or not the schedule type control 146 is set only to "Use Schedule". If so, no further processing of the array of "wake-up" times 176 in RAM 38 is required, and the computer system 32 loops back to step 964, as directed by the sleep sub-process 960, to wait for timer messages from the operating system 62. If, at step 1022, the computer system 32 determines that the schedule type control 146 is not only set to "Use Schedule", the computer system 32 determines, at step 1024, whether or not the value of the restore time waited variable in RAM 38 is greater than or equal to the value of the restore time variable in RAM 38. If so, the sleep sub-process 960 must awaken the recurrent training user application 64 from "sleep" mode and instructs the computer system 32 to branch to step 974 where the computer system 32 terminates the restore timer and begins the process of awakening the recurrent training user application 64. If not, no awakening of the recurrent training user application 64 is necessary at the present time and the sleep sub-process 960 causes the computer system 32 to loop back and wait for timer messages from the operating system 62.

In accordance with an apparatus of an alternate embodiment of the present invention, the recurrent training system is substantially similar to the recurrent training system of the apparatus of the preferred embodiment of the present invention except where noted herein. In the alternate embodiment, the recurrent training system comprises a first computer system located at a user's site and a second computer system, located at a central site, which connects to the first computer system via a communication network. Note that the apparatus and methods of operation of such "networked" computers are considered well-known to those reasonably skilled in the art of the present invention. The first computer system has a program and data domain which includes a recurrent training user application and necessary startup and temporary data storage files. The second computer system has a program and data domain which includes a recurrent training administrator application, a recurrent training content builder application, a plurality of training modules, and a plurality of system data tables. The recurrent training user application and, hence, the first computer system, accesses appropriate training modules of the plurality of training modules and necessary data tables of the plurality of system data tables stored on the second computer via the communication network instead of accessing them locally as in accordance with the first preferred embodiment. The recurrent training administrator accesses the plurality of system data tables, using the recurrent training administrator application on the second computer system, in order to establish and maintain configuration parameters which determine, and limit, which training modules are accessible to a particular user. The recurrent training administrator also monitors, from the second computer system, the training modules actually accessed by the user and the results of testing performed by the user.

Whereas this invention has been described in detail with particular reference to its most preferred embodiments, it is understood that variations and modifications can be effected within the spirit and scope of the invention, as described herein before and as defined in the appended claims. The corresponding structures, materials, acts, and equivalents of all means and/or step plus function elements in the claims below are intended to include any structure, material, or acts for performing the functions in combination with other claimed elements as specifically claimed.

We claim:

1. A training method comprising the steps of:
  configuring a computer to provide training-related information pertaining to a particular subject to a user of the computer;
  presenting the training-related information from the computer to the user of the computer during a first training session administered by the computer at a first time;
  displaying a list of one or more absolute times on the computer;
  receiving a selection of the one or more absolute times, the selection of absolute times corresponding to availability of the user for training, each absolute time comprises a predetermined time during the day corresponding to a twelve hour or twenty-four hour time standard at which one of the subsequent training sessions will begin;
  storing the selection of one or more absolute times as a data file accessible by the computer; and
  initiating subsequent training sessions at the stored absolute times during the day during which the computer presents training-related information to the user of the computer, wherein the computer initiates the subsequent training sessions and in so doing interrupts user interaction with on-going activities on the computer;
  whereby the user of the computer receives recurrent training through recurrent training sessions.

2. The training method of claim 1 further comprising a step of enabling the user of the computer to establish the absolute times for the step of initiating subsequent training sessions.

3. The training method of claim 1, wherein the step of subsequent training sessions is carried out in response to input from the user enabling the user initiation of the training sessions.

4. The training method of claim 1, wherein the training method further comprises a step of configuring whether permission to interrupt must first be granted before initiating the subsequent training sessions.

5. The training method of claim 4, wherein the step of configuring comprises a step of defining a period of time during which one of the subsequent training sessions must be delayed if permission to interrupt has not been grated.

6. The training method of claim 1, wherein the training method further comprises the steps of terminating a training session at a time when certain training-related information is being presented to the user by the computer, and subsequently presenting the same training-related information to the user upon initiation of the subsequent training session.

7. A training method comprising the steps of:
  configuring a computer to perform training activities for a user of the computer;
  displaying a list of one or more absolute times on the computer;
  receiving a selection of the one or more absolute times, the selection of absolute times corresponding to availability of the user for training, each absolute time comprises a predetermined time during the day corresponding to a twelve hour or twenty-four hour time standard at which a training activity will begin;
  storing the selection of one or more absolute times as a data file accessible by the computer;
  in response to user direction, entering a sleep mode for a period of time during which the computer performs other activities;
  awakening from the sleep mode after expiration of the period of time, wherein awakening occurs at one of the absolute times, and,
  reminding the user to do the training activities upon awakening from the sleep mode.

8. The training method of claim 7, wherein the steps of entering, awakening, and reminding are performed recurrently by the computer.

9. The training method of claim 8, wherein the step of reminding comprises a step of prompting the user to determine whether or not the user is ready to do training activities.

10. The training method of claim 8, wherein the step of configuring a computer comprises a step of storing training-related information on the computer and the step of reminding comprises a step of outputting training-related information from the computer to the user of the computer.

11. The training method of claim 8, wherein the computer is a first computer and the training method further comprises the steps of configuring a second computer to communicate with the first computer, storing training-related information on the second computer, accessing the training-related information on the second computer from the first computer, and outputting the training-related information from the first computer to the user of the first computer.

12. The training method of claim 11, wherein the training method further comprises a step of controlling access at the second computer to the training-related information.

13. The training method of claim 11, wherein the training method further comprises a step of monitoring at the second computer the training-related information accessed by the first computer.

14. A computer executable training method comprising the steps of:
  executing instructions of a plurality of instructions of a first computer program on a computer, wherein the computer has a processing unit capable of executing instructions of a computer program and having a storage device which holds training information, an input device connected to and cooperative with the computer, and an output device connected to and cooperative with the computer;

directing input from the input device to the first computer program;

displaying a list of one or more absolute times on the computer;

receiving a selection of the one or more absolute times, the selection of absolute times corresponding to availability of the user for training, each absolute time comprises a predetermined time during the day corresponding to a twelve hour or twenty-four hour time standard at which a plurality of instructions of a second computer program will begin;

storing the selection of one or more absolute times as a data file accessible by the computer;

executing instructions of the plurality of instructions of the second computer program on the computer to recurrently train a user of the computer at one of the absolute times;

redirecting input from the input device to the second computer program in response to execution of instructions of the plurality of instructions of the second computer program; and, outputting training information to the output device of the computer.

15. The training method of claim 14, wherein the training method further comprises a step of delaying for a period of time during which input is directed away from the second computer program.

16. The training method of claim 15, wherein the step of delaying occurs prior to the step of redirecting.

17. The training method of claim 16, wherein the training method further comprises a step of directing input from the input device to the second computer program prior to the step of delaying and the step of delaying occurs in response to input from a user.

18. The training method of claim 17, wherein the training method further comprises the steps of prompting the user for a period of time to delay and receiving from the user a period of time to delay.

19. A computer system for executing an application program and for training a user comprising:

a video display for displaying data and information;

an input device for receiving data and input from a user, for displaying a list of one or more absolute times on the computer, for receiving a selection of the one or more absolute times, the selection of absolute times corresponding to availability of the user for training, each absolute time comprises a predetermined time during the day corresponding to a twelve hour or twenty-four hour time standard at a training session will begin;

a microprocessor for executing the application program;

a memory device for storing the selection of one or more absolute times as a data file accessible by the microprocessor; and means for interrupting interaction between the user and the application program, for presenting training information during a training session on said video display for a selected length of time, for re-establishing interaction between the user and the application program, and for recurrently interrupting interaction between the user and the application program and recurrently presenting training information after an offset time has elapsed or at one of the absolute times, wherein the offset time is an interval of time between the termination of a training session and the initiation of a subsequent training session.

20. An article of manufacture containing a computer program for performing a training method comprising the steps of:

configuring a computer to provide training-related information pertaining to a particular subject;

presenting the training-related information during a first training session administered by the computer at a first time;

displaying a list of one or more absolute times on the computer;

receiving a selection of the one or more absolute times, the selection of absolute times corresponding to availability of the user for training, each absolute time comprises a predetermined time during the day corresponding to a twelve hour or twenty-four hour time standard at which a subsequent training session will begin;

storing the selection of one or more absolute times as a data file accessible by the computer; and initiating a subsequent training session at one of the absolute times during which the computer presents training-related information, and wherein the computer initiates the subsequent training session and in so doing interrupts on-going activities on the computer;

whereby recurrent training is provided through recurrent training sessions.

* * * * *